United States Patent
Charron et al.

(10) Patent No.: US 11,479,345 B2
(45) Date of Patent: Oct. 25, 2022

(54) FLIGHT SYSTEMS

(71) Applicants: Chrystelle Charron, Le Rove (FR); ZIPAIR, Le Rove (FR)

(72) Inventors: Chrystelle Charron, Le Rove (FR); Frankie Zapata, Le Rove (FR)

(73) Assignee: ZIPAIR, Le Rove (FR)

( * ) Notice: Subject to any disclaimer, the term of this patent is extended or adjusted under 35 U.S.C. 154(b) by 68 days.

(21) Appl. No.: 16/770,366

(22) PCT Filed: Dec. 7, 2018

(86) PCT No.: PCT/EP2018/084051
§ 371 (c)(1),
(2) Date: Jun. 5, 2020

(87) PCT Pub. No.: WO2019/110830
PCT Pub. Date: Jun. 13, 2019

(65) Prior Publication Data
US 2021/0171188 A1    Jun. 10, 2021

(30) Foreign Application Priority Data
Dec. 7, 2017 (EP) .................................. 17306723

(51) Int. Cl.
*B64C 15/02* (2006.01)
*B64C 39/02* (2006.01)
*B64D 33/04* (2006.01)

(52) U.S. Cl.
CPC ............ *B64C 15/02* (2013.01); *B64C 39/026* (2013.01); *B64D 33/04* (2013.01)

(58) Field of Classification Search
CPC ........ B64C 15/02; B64C 39/026; B64D 33/04
See application file for complete search history.

(56) References Cited

U.S. PATENT DOCUMENTS 3,243,144 A * 3/1966 Hulbert ................. B64C 39/026
                                          244/4 A
3,381,917 A * 5/1968 Moore .................... B63B 34/15
                                          244/4 A
(Continued)

FOREIGN PATENT DOCUMENTS

| CA | 2844721 A1 | 9/2015 |
| GB | 1250811 A | 10/1971 |
| WO | 2017174942 A1 | 10/2017 |

OTHER PUBLICATIONS

International Search Report (PCT/ISA/210) dated Feb. 12, 2019, by the European Patent Office as the International Searching Authority for International Application No. PCT/EP2018/084051.
(Continued)

*Primary Examiner* — Philip J Bonzell
*Assistant Examiner* — Tye William Abell
(74) *Attorney, Agent, or Firm* — Buchanan Ingersoll & Rooney PC

(57) ABSTRACT

A propulsion device, including a platform configured to support a passenger thereon; a thrust engine coupled to the platform, wherein the thrust engine is configured to provide a thrust output substantially along a first axis; a deflector assembly positioned proximate the thrust output, wherein the deflector assembly includes two deflecting guides to divert the thrust output into at least two thrust vectors angled with respect to the first axis; an actuator coupled to each deflecting guide to controllably adjust a position of the deflecting guides with respect to the thrust engine; and a controller in communication with the actuator, wherein the controller is configured to operate the actuator in response to one or more signals from at least one of the passenger and a sensor coupled to the platform.

16 Claims, 15 Drawing Sheets

(56) References Cited

U.S. PATENT DOCUMENTS

| | | | | |
|---|---|---|---|---|
| 3,912,201 | A * | 10/1975 | Bradbury | B64C 29/0016 244/23 D |
| 4,447,024 | A * | 5/1984 | Williams | B64C 39/026 244/4 A |
| 5,070,955 | A * | 12/1991 | Lissaman | B64C 27/20 180/117 |
| 7,258,301 | B2 * | 8/2007 | Li | B63H 11/04 244/4 A |
| 8,020,804 | B2 * | 9/2011 | Yoeli | B64C 15/02 180/117 |
| 2005/0151002 | A1 * | 7/2005 | Ishiba | B64C 39/026 244/10 |
| 2006/0049304 | A1 * | 3/2006 | Sanders | B64C 27/12 244/23 A |
| 2008/0142644 | A1 * | 6/2008 | O'Roark | B64C 39/026 244/4 A |
| 2009/0020654 | A1 * | 1/2009 | Tyler | B64C 39/026 244/23 A |
| 2010/0006697 | A1 * | 1/2010 | Horinouchi | B64D 33/04 244/1 N |
| 2013/0068895 | A1 | 3/2013 | Zapata | |
| 2014/0158832 | A1 * | 6/2014 | Zapata | B63B 34/15 244/23 A |
| 2014/0263849 | A1 * | 9/2014 | Li | B63H 11/04 244/23 A |
| 2015/0028161 | A1 * | 1/2015 | Parks | B63H 11/113 244/23 R |
| 2015/0360755 | A1 * | 12/2015 | Robinson | B63H 21/22 440/38 |
| 2016/0340035 | A1 * | 11/2016 | Duru | B64C 39/026 |
| 2018/0127094 | A1 * | 5/2018 | Zapata | G05D 1/0858 |
| 2019/0256174 | A1 * | 8/2019 | Zapata | A63B 35/12 |

OTHER PUBLICATIONS

Written Opinion (PCT/ISA/237) dated Feb. 12, 2019, by the European Patent Office as the International Searching Authority for International Application No. PCT/EP2018/084051.

* cited by examiner

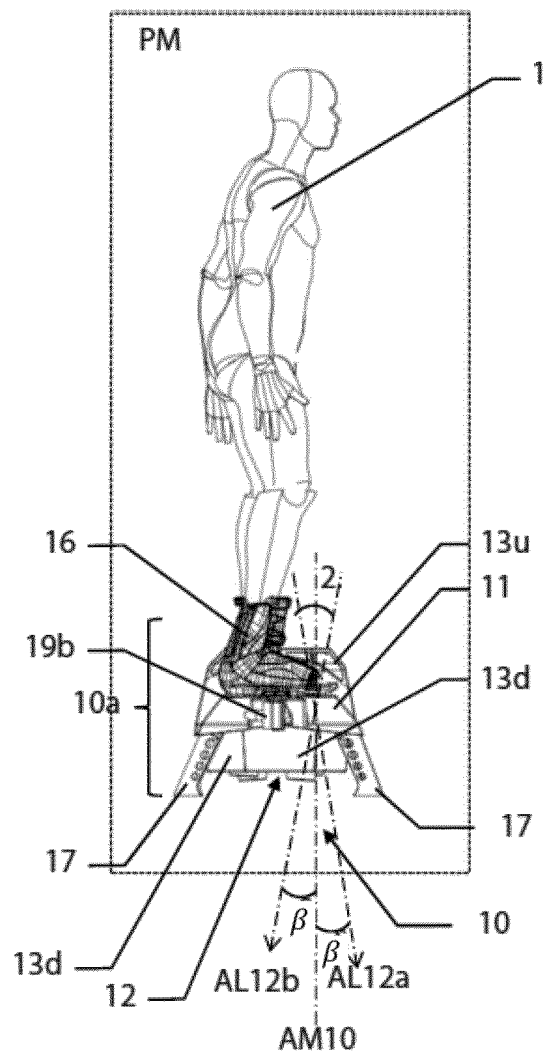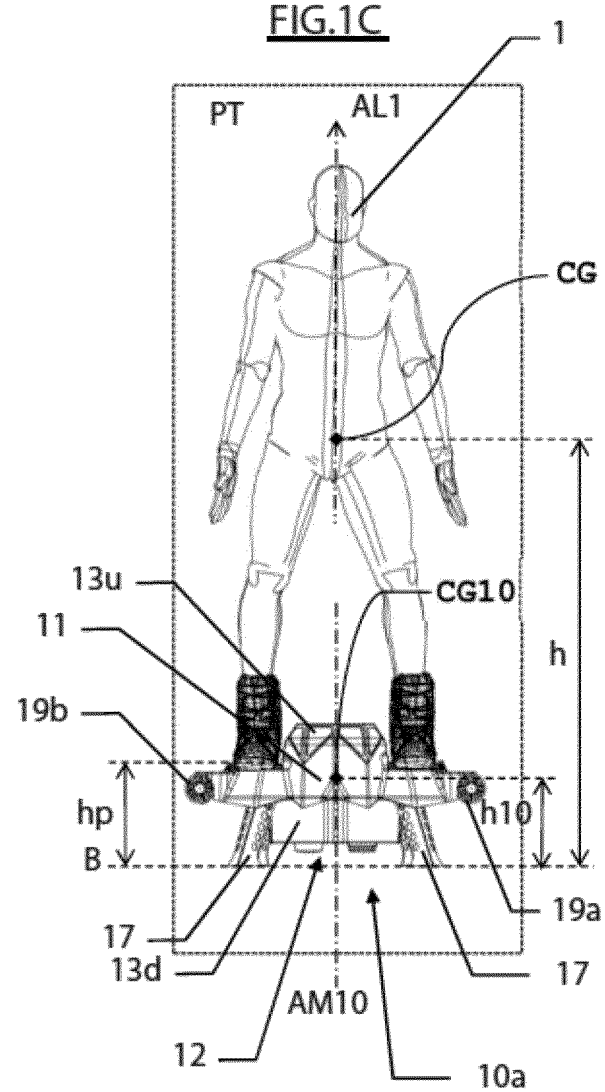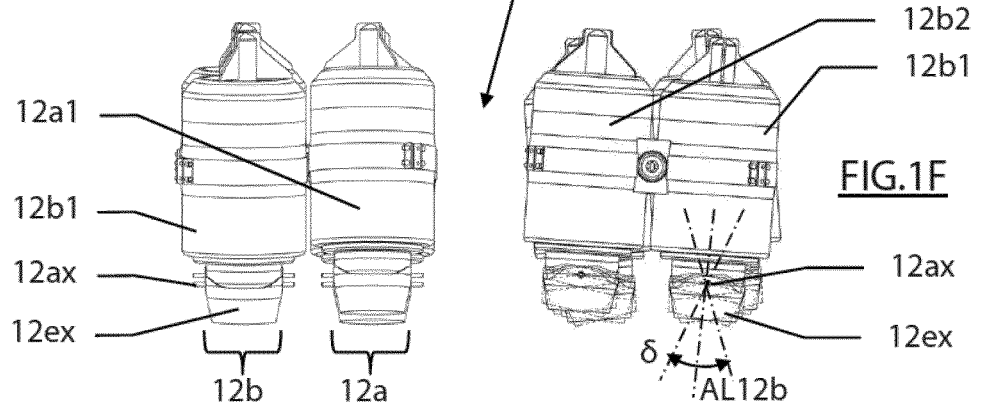

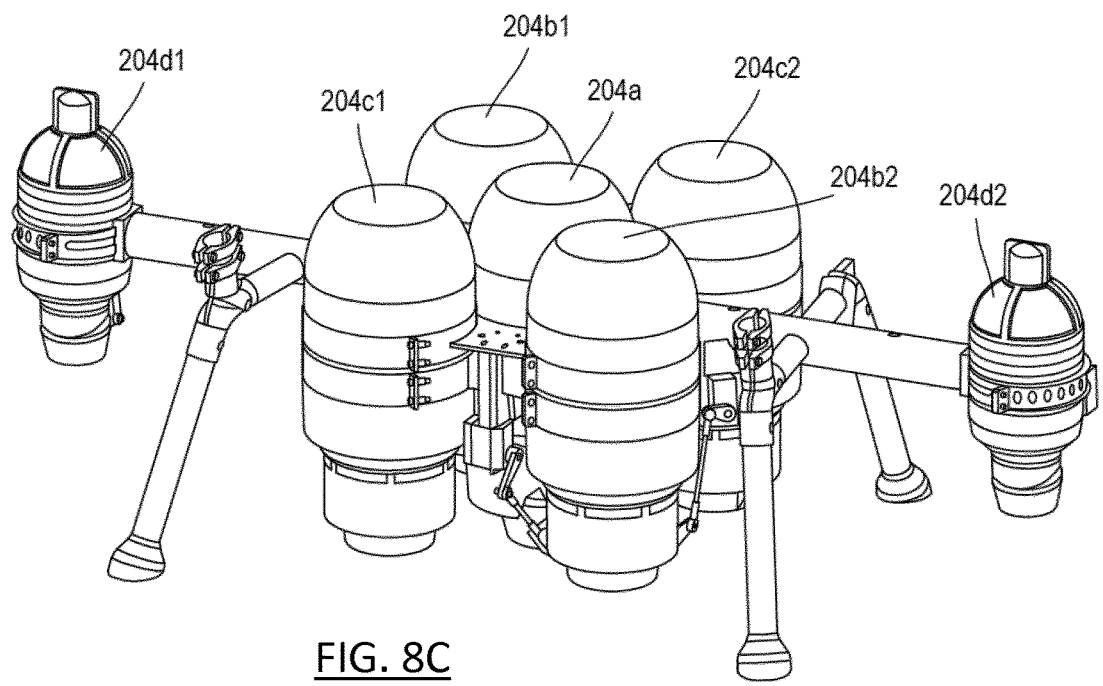
FIG. 8C
FIG. 8D
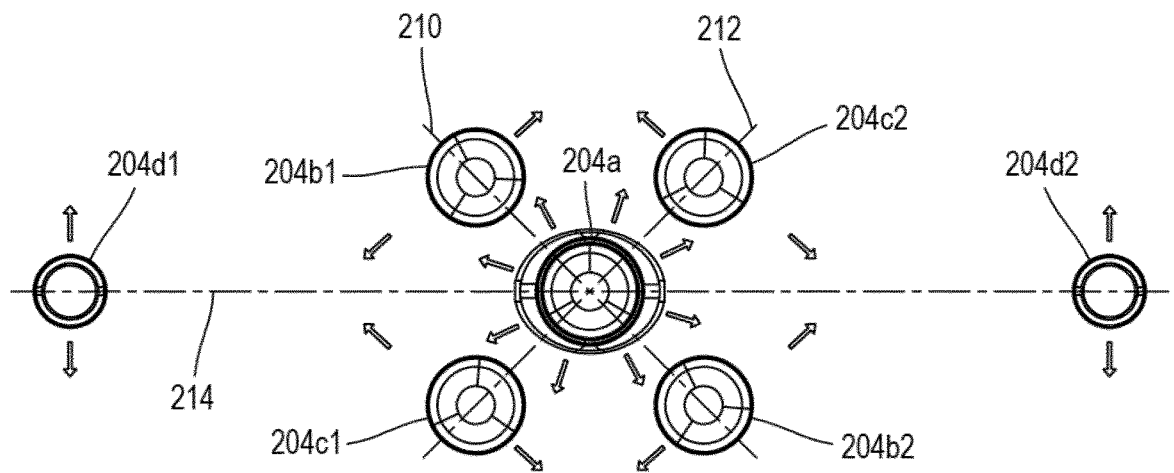

FLIGHT SYSTEMS

The present disclosure relates preferably but not respectively to passenger propulsion devices, in which one or more passengers can move through the air with enormous freedom of movement through agility and physical configuration. Such propulsion devices, more particularly their platform configurations, might be also arranged for transporting goods, cargo, instruments, tools, equipment, or the like. The present disclosure relates more particularly to thrust systems included in said propulsion devices.

Humans have always been preoccupied by being able to move around as freely as possible in space. Various efforts have been undertaken to achieve such a goal. For example, flying devices are provided in U.S. Pat. Nos. 3,243,144 and 3,381,917 and, more recently, in U.S. Pat. No. 7,258,301 or U.S. Patent Pub. No. 2013/0068895, which employ a distant fluid compression station. Despite such devices and disclosures, shortcomings in capacity and mobility remain for would-be pilots desirous of acrobatic capabilities, precision movement on or across water and land surfaces at high and low speeds in a manner allowing mass deployment and adoption.

The present disclosure provides a thrust system, including a thrust engine configured to provide a thrust output substantially along a first axis; a deflector assembly movably coupled to the thrust engine, wherein the deflector assembly include a pair of deflecting guides cooperatively movable to selectively deflect a portion of the thrust output and is configured to divert the thrust output into at least two thrust vectors angled with respect to the first axis. The at least two thrust vectors may all have substantially the same magnitude. Each thrust vector may be angled between approximately 45 degrees and approximately 90 degrees with respect to the first axis. Each thrust vector may have substantially the same angle with respect to the first axis. The thrust system may include an actuator coupled to the deflecting guides to controllably adjust a position of the deflecting guides with respect to the thrust engine. The system may include a controller in communication with the actuator, wherein the controller is configured to operate the actuator in response to one or more signals from at least one of an operator and a sensor. The deflecting guides may each be substantially planar and oriented in a plane substantially perpendicular to the first axis. The deflecting guides may be movable towards and away from one another within the plane. The deflecting guides may be pivotable with respect to the thrust engine. The deflecting guides may be pivotable about a second axis substantially perpendicular to the first axis. The second axis may be located above the thrust output of the thrust engine. The deflecting guides may each define a substantially curvilinear surface that deflects the thrust output. The deflecting guides may each define a surface having a substantially semi-circular cross-section that deflects the thrust output. The thrust engine may be one of a turbojet engine, a turbofan engine, and a turboprop engine.

The present disclosure also provide a propulsion device, comprising a platform (11) configured to support a passenger thereon, a thrust system coupled to the platform, wherein the thrust system is configured to provide a thrust output substantially along a first axis and is according to the present disclosure.

A more complete understanding of the present disclosure, and the attendant advantages and features thereof, will be more readily understood by reference to the following detailed description when considered in conjunction with the accompanying drawings wherein:

FIGS. 1A, 1B, 1C, 1D, 1E, 1F and 1G illustrate an example of a propulsion device constructed in accordance with the principles of the present disclosure;

FIGS. 8A-8D illustrate another example of a propulsion device constructed in accordance with the principles of the present disclosure;

Figure 1A:
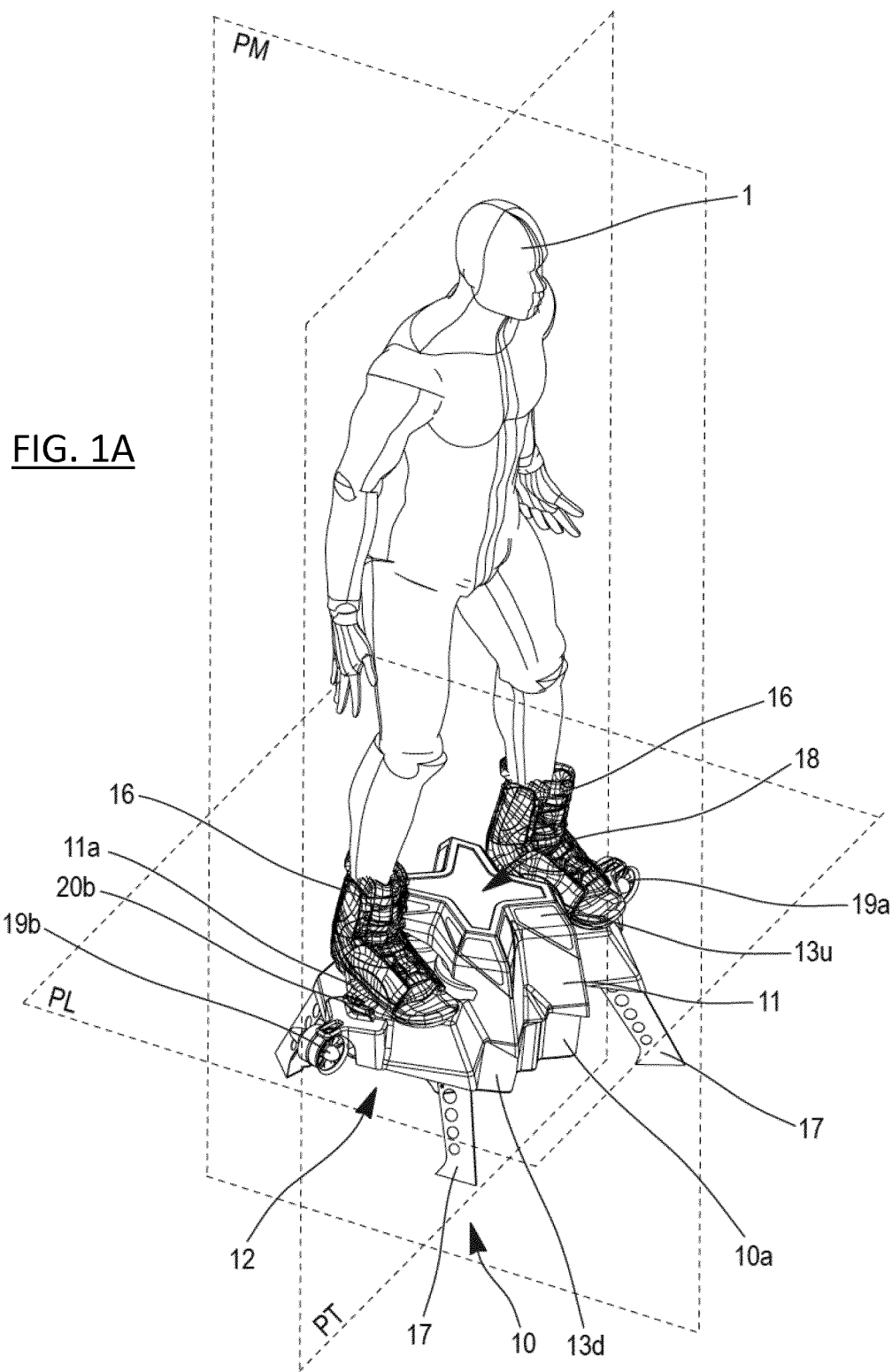

The present disclosure provides personal propulsion devices and improved control systems and methods of use thereof. The principles and features disclosed herein may be applied to different platform configurations to transport one or more passengers, cargo, instruments, tools, equipment, or the like. Examples of the numerous advantages provided herein include: increased and improved maneuverability; operational redundancy to maintain the safety of the pilot and possible passengers; increased system autonomy and thus the duration and/or distance of flight; take-off and landing capabilities within a particularly reduced area of only few square meters.

In one example of a propulsion device provided herein, the device consists of a body containing a platform arranged to accommodate the passenger and a thrust system. The thrust system may include at least a sub-thrust system containing at least two thrusters; the ejection direction of the gas flow from each booster can be oriented along a quite normal axis on a longitudinal plane of the platform; the body of the device has means for supporting the thrust group working with the platform and being arranged to support the thrust system and minimize the distance between the ejection direction of the gas flows by the ejection nozzle of each booster and the orthogonal projection of the ejection direction of gas flow on a median plane passing by the center of gravity of the body of the device.

Depending on the configuration of the body of such a device, the latter can contain a second sub-thrust system working with the platform, the support means of the thrust system being arranged to support the second thrust system parallel to the first sub-thrust system, while minimizing the distance between a median plane passing by the center of gravity of the device body and the ejection direction of the gas flow by the ejection nozzle of each booster.

In order to increase the maneuverability of such a propulsion device, the platform can be arranged to the feet of the passenger to occupy a position, the height of which relative to the lowest point of the device, when the passenger is upright or approximately vertical on the platform and the booster ejection nozzles are oriented toward the ground, is: approximately equal to or greater than the height relative to the low point of the center of gravity of the body of the device, and lower at the height relative to the low point of the center of gravity of the whole thing including the device and the passenger.

To protect the thrust system of such a propulsion device, the body of the latter can have protrusions working with the platform and arranged to prevent any shock or direct contact between the ground and the thrust system of the device.

The thrusters may include propellers and/or turbojets, and the thrusters maybe arranged in a counter-rotation configuration. As an alternative or additionally, the support means and/or the thrusters of the thrust group can be arranged to orient the ejection direction of the gas flow by the respective ejection nozzles of the thrusters at an angle between approximately −45° and approximately +45° with an axis parallel to a median axis of the platform.

To preserve the physical integrity of the passenger, a propulsion device depending on the disclosure can have a cowl, working with the platform or constituting a unitary construct with the platform, that is arranged to prevent any direct contact between the thrust system and the passenger. Additionally, the cowl can contain a grid arranged to partially obscure the fluid intakes of the thrusters of the thrust system and thus prevent any inhalation of foreign bodies or debris by the fluid intakes. To keep the passenger on the body of the propulsion device, the latter can advantageously have means to ensure that the passenger stays on the platform.

In order to more readily steer the propulsion device through a curved trajectory, the thrust group can have secondary cap correction thrusters, the support means of the thrusters being arranged to work with the secondary cap correction thrusters. The support means can be advantageously arranged to maintain the later according to an orientation approximately parallel to a longitudinal plan of the platform.

Depending on the configuration of the platform, notably if it is elongated, like the chassis of an equivalent land vehicle like a motorbike or a car, the passenger may not be able to sufficiently affect the base of the platform by the orientation of their body. To help steer such a propulsion device, the thrust system can have secondary base correction thrusters, the support means of the thrusters being arranged to work with the secondary base correction thrusters. The support means can be advantageously arranged to maintain the latter in an orientation approximately normal to a longitudinal plane of the platform.

To feed the thrust system of a propulsion device depending on the disclosure, the latter can advantageously have in addition a fuel tank connected to the thrusters of the thrust system to feed fuel to the latter, the tank working alongside the body of the device or the passenger.

So that the passenger can carry the tank like a backpack, such a tank can have a flexible envelope and a harness to work with the body of the passenger, the attachments of which are designed to be easily removed by the passenger in the event of an emergency.

So that the passenger can steer their propulsion device, the latter can have a man-machine interface translating a passenger gesture into an instruction, the processing means of the instruction produced and the generation of a booster power order using the instruction produced, the thruster power order being fed into the thrust system by means of communication.

Such a propulsion device can furthermore contain a base and/or trajectory sensor working with the body of the device roughly in the position of the center of gravity of the latter and with the processing means, the latter generating the booster power order from the information delivered by the base and/or trajectory sensor along with an instruction produced by the man-machine interface.

When the device has secondary cap correction thrusters, to land the propulsion device, the processing means, present on the body of the device, can generate power instructions from the secondary cap correction thrusters from information delivered by the base and/or trajectory sensor to operate one of the secondary thrusters and maintain the current trajectory of the body, in the absence of instruction produced by the man-machine interface.

In the same way, when the device has secondary base correction thrusters, the processing means, present on the body of the device, can generate orders of power from the secondary base correction thrusters from information delivered by the base and/or trajectory sensor to one of the secondary base correction thrusters and keep a base roughly horizontal to the body, in the absence of instruction produced by the man-machine interface.

An example of the preferred outcome, such a man-machine instruction interface can have a trigger which can be operated by one or several fingers of the passenger. The processing unit can then develop a booster power order to adjust the power developed by the thrust system according to the position of the trigger.

As an alternative or additionally, the man-machine instruction interface can have an angle measure sensor measuring the angle defined by the fist of a passenger compared to the longitudinal axis of the forearm in question compared to a reference position according to which the hand of the passenger is aligned with the forearm. The processing unit can then develop a secondary booster power order to adjust the power developed by the latter according to the position of the fist.

FIG. 1A presents a view in perspective of an initial preferred embodiment of a propulsion device for one passenger 1 according to the disclosure. Such a device comprises a main body 10a mainly in the form of a platform 11 on which a passenger 1 can take place. Depending on the dimensions of the platform 11 and the power of the thrust system 12 of the device 10, the disclosure envisages that several passengers can possibly take place at the same time on the platform 11. The platform 11 has, to this end, one or several surfaces 11a arranged to receive the feet or shoes of the passenger 1, as indicated more clearly in FIG. 1D.

The disclosure is envisaged so that such surfaces 11a can have means 16 for supporting the passenger 1 on the platform 11. Thus, depending to the position desired by the passenger 1 on the platform 11 of a device according to the invention, said support means 16 can consist in a pair of fixing shoes or boots of a type similar to that which can be found, for example in the practice of wakeboarding. Other types of support means may be preferred, depending on whether a passenger is to be hold in a "legs bent" position, kneeling, or even sitting.

Such a platform 11 can be advantageously designed using one or several materials having, alone or in combination, sufficient rigidity to support the weight of the passenger(s) and prevent thereby any excessive deformation.

Figure 1D:
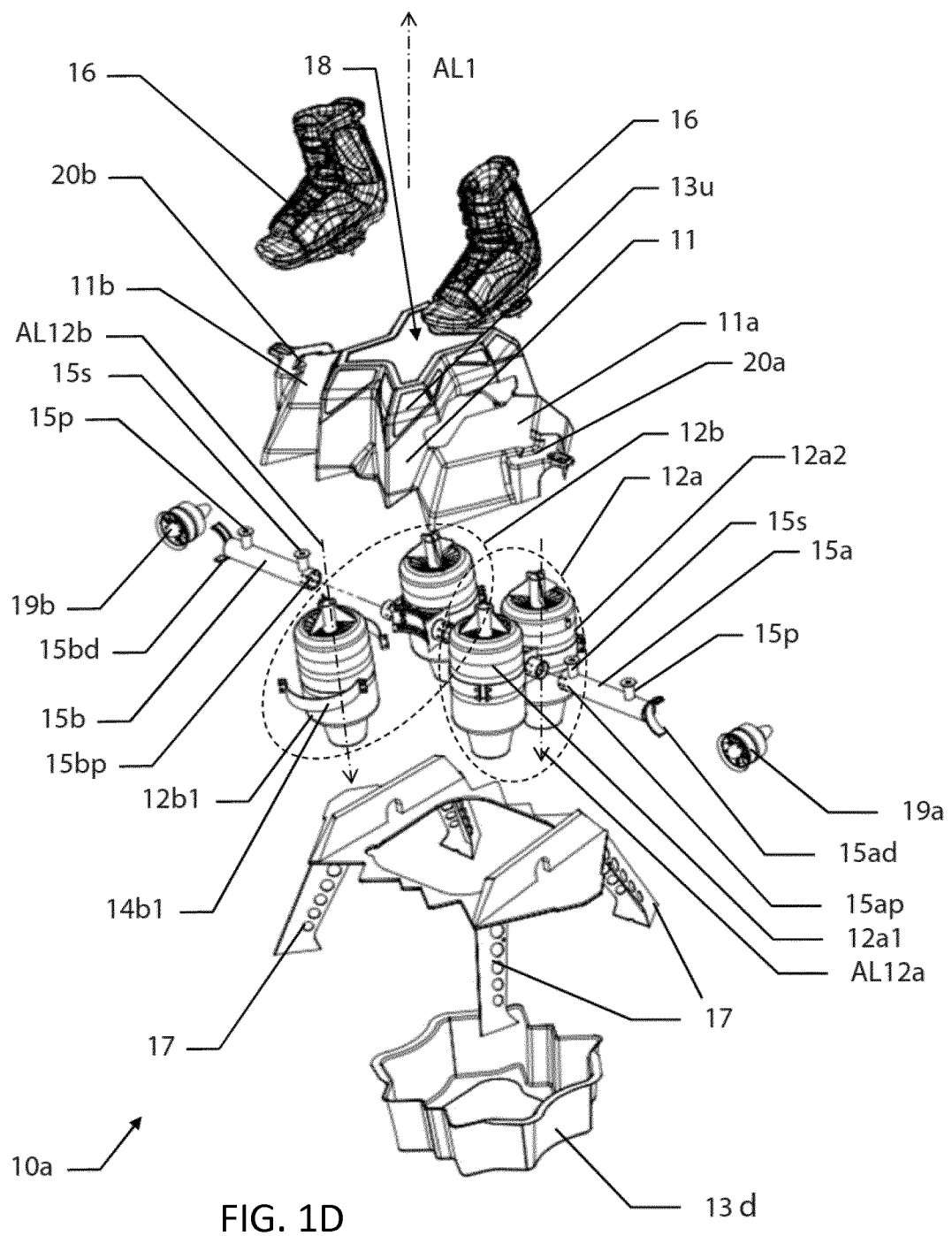

The body 10a of the propulsion device described in relation with FIGS. 1A and 1D has a thrust system 12 cooperation with the platform 11.

As used herein, the following terms are used to describe features as follows:

"median plane" PM: any normal plane notably to platform 11, which separates a port half from a starboard half of the body 10a of the device 10, the halves not necessarily being equal;

"transversal plane" PT: any normal plane to a median plane, which separates the body 10a of the propulsion device into two halves, one including the front, the other including the back of the body, the halves not necessarily being equal;

"longitudinal plane" PL: any normal plane to transversal and median planes, the longitudinal plane separating an upper half from a lower half of the body 10a of the device 10, the halves not necessarily being equal.

Such MP, PT, PL planes are illustrated by dotted lines on FIG. 1A. As used herein, the following terms are used to describe features as follows:

"transversal axis": any axis belonging both to a transversal plane and a longitudinal plane;

"longitudinal axis": any axis belonging both to a median plane and a longitudinal plane;

"median axis": any axis belonging both to a median plane and a transversal plane.

A propulsion device according to the invention comprises other accessory elements, not represented for simplification reasons in FIG. 1A, such as a fuel tank to feed the thrust system 12 or even a man-machine interface, of the remote-control type for example, so that the passenger 1 can interact with the thrust system 12 of the device 10. Such a man-machine interface shall be described in conjunction with FIG. 2.

FIGS. 1B, 1C and 1D describe an non-limitingly propulsion device according to the invention, in profile and in front view respectively. We can observe in light of FIGS. 1A, 1B and 1C, that the body 10a of such a device has protrusions 17, which can advantageously be retracted during flight, cooperating with the platform 11 and arranged to prevent any shock or direct contact between the ground and the thrust system 12 of the device 10. The protrusions may be retractable through a telescoping, folding, or other collapsible configuration that reduces the profile and/or dimensions of the protrusions 17 at a desired stage of flight or use.

Such protrusions 17 can consist specifically in four feet sufficiently long as to prevent the ejection nozzles of the thrust system 12 from hitting the ground and also and to offer also a certain stability, when the device is on the ground or on a take-off station, not represented in FIGS. 1A to 1C, so that the passenger can effectively take place on the platform 11. As an alternative, such protrusions 17 may consist of a pair of skis or any other elements aimed at ensuring a certain stability according to the nature of the ground or the support of the device.

FIG. 1D presents an exploded view of a body 10a of such a device according to the invention. As indicated in the FIG. 1D and as an unlimited example, contrary to the known devices, the thrust system 12 consists advantageously of a pair of sub-thrust systems 12a and 12b each having two thrusters or engines. Thus, a first sub-thrust system 12a has two thrusters 12a1 and 12a2. The same applies sub-thrust system 1b which has two thrusters 12b1 and 12b2. As an alternative, such sub-systems may have more than two thrusters. According to a second alternative, the thrust system 12 may have more sub-thrust systems, themselves having one or several thrusters. The example of configuration, described in liaison with FIG. 1D, although not limiting the disclosure, prevents certain qualities regarding other thrust system configurations. In fact, a device may develop with a thrust system reduced to a thruster, for example a thermal turbojet type.

In fact, the length of such a single thruster, to enable the latter to deliver a thrust sufficient to propel into the air the device 10 and its passenger 1, would be about one meter, or even longer. In the same way, we could imagine a thrust system 12 with two sub-thrust systems each with one thruster. The bulk by each thruster would be reduced, but such a thrust system 12 would have major disadvantage in terms of safety, like the one-thruster configuration mentioned previously. In fact, if one of the two thrusters fails, the total thrust of the system would be insufficient to keep the passenger 1 in the air and to preserve sufficient maneuverability.

Contrary to these two possible configurations, a configuration as illustrated in liaison with FIG. 1D, according to which a thrust system 12 has at least two sub-thrust systems 12a and 12b each having at least two thrusters 12a1 and 12a2 for one and 12b1 and 12b2 for the other, offers a particularly interesting compromise.

Thus, the space taken up by the four thrusters, for example jet engines, remains completely compatible with the desired methods of use. Moreover, the propulsion device remains perfectly maneuverable, even if one of the thrusters fails.

To offer improved maneuverability, the thrusters of the thrust system 12 are advantageously positioned as close as possible to the center of the body 10a of the device 10.

This reduces the moment of inertia that the passenger must overcome in order to change, with the aid of his body, the attitude of the device 10 and thus move:

straight ahead, if he places the weight of his body towards the front of the device 10;

backwards, if said passenger 1 places the weight of his body towards the back of the device 10;

diagonally forwards, if said passenger 1 places the weight of his body towards the front of the device 10 and on one or the other side thereof;

diagonally backwards, if said passenger 1 places the weight of his body towards the back of the device 10 and on one or the other side thereof.

In order to be able to pivot easily and move through curves, the thrust system 12 can advantageously include two secondary course-corrector thrusters 19a and 19b The latter are advantageously arranged eccentrically along a transverse axis of the platform. By being activated in a non-simultaneous manner, these thrusters respectively create sufficient torque to develop a curved trajectory.

The different thrusters of the thrust system are maintained and supported by the supporting means 14; an example of the structure will be described below. These supporting means 14 constitute the functional equivalence of a frame supporting the platform 11 and cooperating through an advantageous mechanical connection, without any degree of liberty or embedded connection with the protrusions 17, providing a base and protection of the thrust system 12 of this device 10.

In relation to the embodiment described by FIG. 1D, the body 10a of a propulsion device according to the invention can include a fairing 13u, possibly in the form of one or more fairing elements connected to one another, cooperating with the platform 11 and/or the supporting means 14, by any reversible or irreversible embedded mechanical connection (e.g. welding, screwing) or constituting with the platform 11 and/or supporting means 14 as a single physical entity. The purpose of the fairing 13u is to prevent any direct contact between the thrust system 12 and the passenger 1. The morphology (sizes, shape) of the fairing 13u will be thus arranged to match the dimensions of the thrust system 12, to confer an aesthetic appearance and/or promote the aerodynamics of the propulsion device, all while limiting any discomfort for the passenger. It is indeed important to be able to limit any contact between the passenger and the thrust system to prevent any risk of injury, the temperature of the outside walls of the thrust group 12 can quickly become very high. Furthermore, the upper part of the body 10a of the device 10, located substantially between the passenger's 1 feet, includes a fluid inlet 18, in this case an air inlet, to supply fluid to the thrusters through their respective fluid inlets. The thrusters include rotors that could injure the passenger 1 if they inadvertently put his hand in the fluid inlet 18. Moreover, suction of foreign elements (leaves, debris, volatile matter, etc.) through the fluid inlet 18 could disturb the functioning of the thrust group 12. For this purpose, the fairing 13u can advantageously include a grill, not shown in FIG. 1D, the configuration of which partially covers the inlet 18 and thus limits or prevents the suction of foreign bodies through the air inlet 18, while preserving the fluid exchange between the outside world and the thrusters.

In addition and/or alternatively to the fairing 13u reducing the likelihood of debris intake, the device 10 may include one or more filters movably and/or selectively coupled to one or more of the thrusters of the thrust systems. For example, as shown in FIG. 1G, an intake filter may be movably coupled to an intake region of the thruster 12a1 (and/or any of the other thrusters 12a2, 12b1, 12b2, etc.). The intake filter 30 may have pass-through or filtration size appropriate to restrict passage of a particular debris size of concern (e.g., larger bodies such as leaves, or smaller, particulate matter such as sand and dirt). The intake filter 30 may be selectively positionable about the intake region in a first position that substantially seals the intake filter to the intake of the thruster, and a second position where the intake filter 30 is offset or at least partially removed from the intake region of the thruster. In the first position, substantially all of the fluid flow into the thruster must pass through the intake filter, while in the second position, fluid flow into the thruster may at least partially bypass the intake filter 30. The movement of the intake filter 30 may be achieved through the use of a servo, actuator, motor, or other mechanism 32 providing a user or operator of the device 10 with the capability to selectively adjust the placement and position of the intake filter 30 during use. In one example, the intake filter 30 may be kept in the first position during takeoff and/or landing, when debris is more likely to be present and in proximity to the device. The intake filter may be moved to the second position once the device 10 has achieved sufficient altitude where debris intake is minimized, and thus fluid flow into the thruster can proceed uninhibited by the intake filter 30, which may provide an increased performance capability.

The FIG. 1D also describes the use of a lower fairing 13d, cooperating by means of any embedded mechanical connection, also providing a protective function to the passenger or the close environment from the fluid outlets or the gas ejection nozzles of the thrusters of the thrust sub-groups 12a and 12b. Indeed, the temperature can be particularly high when in direct proximity to the ejection nozzles. Such open fairing offers a circumferential or lateral protection. Like the fairing 13u, which we can call the upper fairing, the geometry of the fairing 13d can furthermore be advantageously designed so as not to affect the gas ejection of the thrust group and improve the aerodynamics of the device 10 body 10a. The choice of the material(s) envisaged to form these fairing elements 13u and 13d will be based on the maximum temperature of the thrust system 12 in close proximity with the fairing elements, so that they do not alter their structure.

Figure 1E:
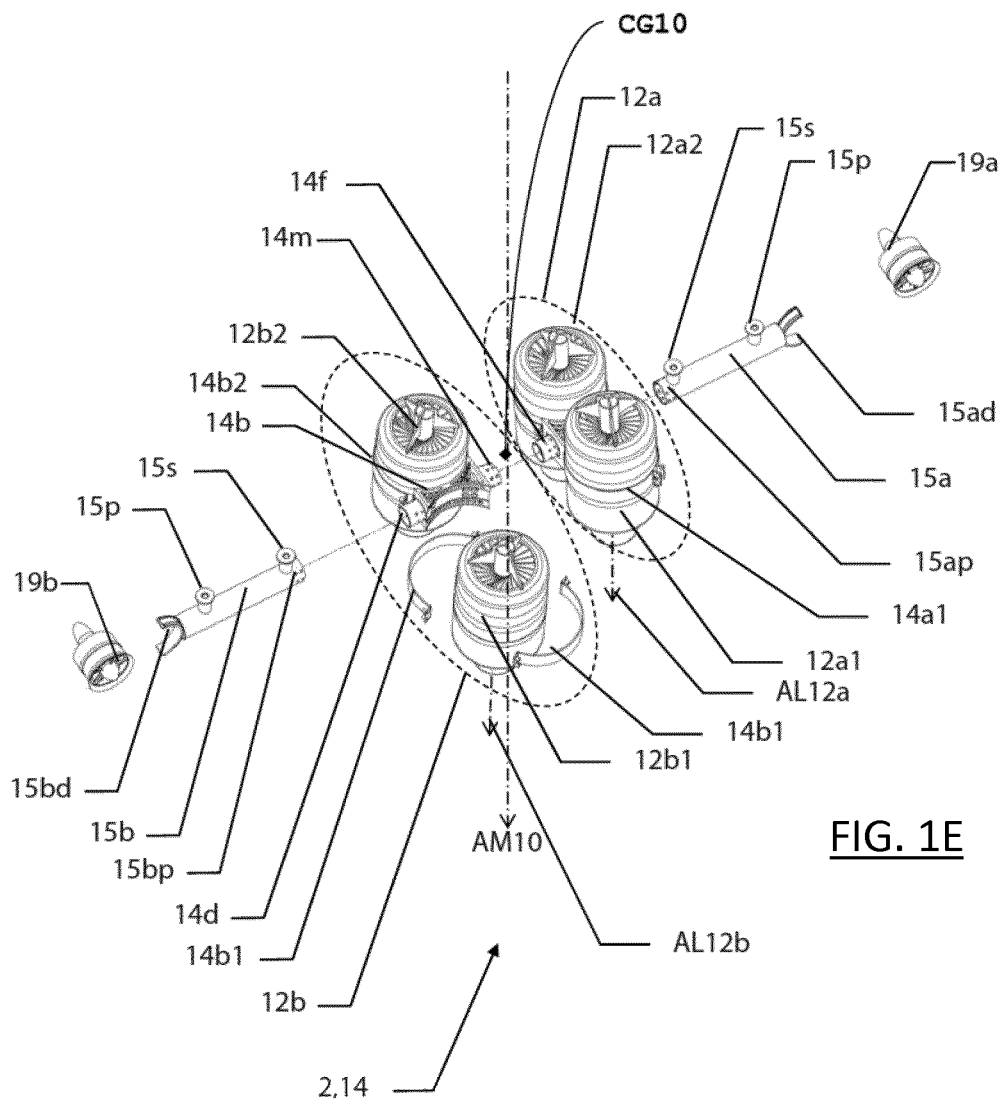
Figure 1G:
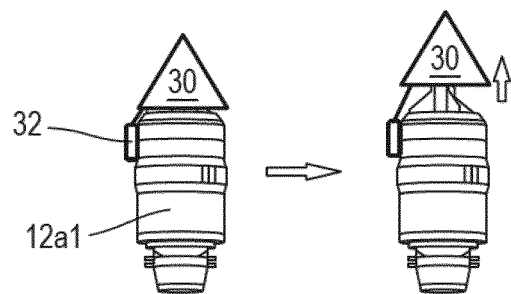

FIG. 1D also describes the presence of secondary the presence of course-correction secondary thrusters 19a and 19b located laterally, not centrally, unlike the thrust sub-units 12a and 12b We will describe the supply of these secondary propellers in conjunction with the detailed presentation of a thrust group example illustrated by FIG. 1E.

FIG. 1D does not describe most of the electronic elements for simplification. As an example, as we see in the description of the thrust group 12 in conjunction with FIG. 1E, the body 10a of a propulsion device, in accordance with the disclosure, includes or cooperates with instruction processing means for the passenger to steer the power of the propellers.

Furthermore, such processing means can also work with or include one or several sensors, such as, but not limited to, an inclinometer, an accelerometer, an altimeter, GNSS receiver, a GPS receiver (Global Positioning System), a probe or pitot tube and/or gyroscope, that can deliver information in connection with the attitude, the speed, or generally the trajectory of the body 10a of the device 10. The processing means are also arranged to generate propulsion power commands of the thrust systems 12, particularly the thrusters of the thrust sub-groups 12a and 12b, according to the passenger instructions and/or information produced by the sensors. The same applies to generating the power commands of the course-correction secondary thrusters 19a and 19b. Such processing means can take the form of one or several electronic boards, advantageously positioned close to the center of inertia and CG of the body 10a of the propulsion device 10, especially if the sensors are included in the electronic boards. FIG. 1C particularly illustrates the virtual position of the center of gravity CG10 of the body 10a in the example of the implementation of the propulsion device 10. In the rest of the document, we consider the terms "processing means of the propulsion device body or present in the body" as covering any arrangement allowing, in particular, to:

fix the processing means in or on the body 10a, for example on the platform 11 and/or the support system 14, 15a, 15b, and/or Connect the processing means with a terminal block or coupling to the sensors and/or thrusters, when the processing means are arranged to be connected and/or disconnected by the passenger and/or carried by the passenger.

In conjunction with FIGS. 1C and 1E, we will now study the structure of a preferred embodiment of a thruster system 12, of the propulsion device according the disclosure and the support means 14 of such thrust system.

As mentioned above, such thruster system 12 includes two thrusters 12a and 12b subunits, each comprising two thrusters, referenced 12a1 and 12a2 for the first, and 12b1 and 12b2 for the second. Such thrusters can consist in thrusters with propellers or rotors, or preferably, and in this case as shown in FIG. 1E, of turbojet engines. A turbojet engine is a heat engine, commonly used in aviation, that transforms the potential energy contained in fuel, for example kerosene or equivalent, associated with a combustion agent, in this case ambient air sucked through the fluid inlet 18 of the body 10a, into kinetic energy. This kinetic energy generates a reaction force in an elastic medium in the opposite direction to the ejection of a gaseous discharge. This results in an acceleration of a certain amount of air between the thruster fluid inlet and the ejection nozzle thereof, producing a thrust by expansion in the ejection nozzle. Such thruster uses a an air compressor with blades or rotors. Any other type of fuel could eventually be used instead of kerosene as mentioned above.

According to FIGS. 1C, 1D and 1E, we can see that each thruster of the thruster subunits 12a and 12b is adjustable and, in nominal operation, oriented according to a AL12a axis (for the thruster 12a2) or AL12b (for the thruster 12b1) substantially normal to a longitudinal plane of the platform 11, namely substantially parallel to a longitudinal axis AL1 of the passenger 1. These thruster are also oriented in a way so that the ejection nozzle of each of these thrusters rejects a gas flow in an opposite direction to that of the oriented longitudinal axis to AL1, from the feet to the head of passenger 1. In this way, the thruster "push" the passenger 1 via the platform 11. As mentioned above, in particular to increase the maneuverability of the device 10, the main body 10a includes a support means 14 of the thruster unit 12, cooperating together with platform 11, arranged to support the thruster unit 12 by concentrating the thrusters as centrally as possible of body 10a. Thus, these support means 14 minimize as far as possible the distance between the directions of the gas flow ejections AL12a and AL12b by the respective ejection nozzles of the thrusters 12a1, 12a2, 12b1, 12b2 and the respective orthogonal projections of said directions in a virtual median plane PM passing through the center of gravity CG10 of body 10a of the device 10, these gas flow ejection directions being substantially parallel to the median plane PM. In the case of such a device, specifically, the support means 14 are arranged to minimize the distance between the ejection directions and the virtual central axis AM of the body 10a through the center of gravity CG10. This reduces the moment of inertia that the passenger has to overcome to change, using his body, the attitude of the body 10a and consequently the trajectory of the propulsion device 10. Thus, the playful nature provided by the use of such propulsion device is tenfold.

According to the example shown in FIGS. 1C, 1D and 1E, the center of gravity CG of the body 10a is substantially located at the center of the two thrusters 12a and 12b of the thruster subunits. By way of a preferred but not limited to example, the support means 14 may comprise a plate per thrust subunit on which are mounted by an embedded mechanical connection, collars respectively encircling the thrusters of each sub-unit. In this way, the thrusters of the same thruster subunit are held together and are oriented along parallel longitudinal axes. Thus, two collars 14b1 and 14b2 encircle respectively thrusters 12b1 and 12b2. The two collars are as well fixed onto a plate 14b. The same applies to the thrusters of the subunit 12a. Two collars 14a1 and 14a2 respectively encircle the thrusters 12a1 and 12a2. The collars cooperate with plate 14a, mostly hidden in FIG. 1E. The thickness of plates 14a and 14b is minimized in the middle to a minimum so that the thrusters of the same sub-unit are as close to one another as possible. Similarly, the support means 14 are arranged so that the proximal portions of the plates can cooperate, so that the thruster subunits are as close as possible. These proximal portions 14m, for plates 14b and 14f, for plate 14a, may suitably describe a hollow cylinder. Sections of these cylinders are also suitably selected so that one of the proximal portions penetrates the second one. Using holes opening on either side of each cylinder according to the normal axis to the revolution axis of the proximal portions 14f and 14m, and a pin for example, it is possible to secure the two thruster sub-units. It could alternatively be possible to create an embedded type mechanical connection by welding to secure the two plates 14a and 14b.

These two plates allow the distance separating each thruster of the thrust sub-units 12a and 12b to be reduced to a minimum from a median plane of the platform 11 passing through the center of gravity CG10 of the body 10a of the device 10. When the thrusters of the two thruster subunits comprise the compressor rotors counter-rotating mounted, the ejection directions of the thruster nozzles, for example the referenced directions AL12a and AL12b in FIG. 1E, can be parallel to one another and substantially normal to a longitudinal plane of the platform 11.

On the contrary, the rotation of the rotors within each thruster could result in rotation about itself of the thrust unit 12 and, consequently, of the body 10a of the device 10. To overcome this inconvenience, the disclosure provides that the support means 14 can be arranged to orient the ejection direction of gas flow through the ejection nozzle of each engine of each thruster sub-unit 12a and 12b, so that the gas flow ejection direction describes an angle $\beta$ of between $-10°$ and $+10°$ with a median axis AM10 of platform 11 or of the body 10a. As shown in FIG. 2B, it is possible to slightly intersect said ejection directions of both subunits 12a and 12b forming an angle resulting from the double of "$\beta$", referenced "2.$\beta$" in FIG. 1B. A angle $\beta$ of an absolute value of four degrees is sufficient to cancel the effect mentioned above, if the thrusters are not counter-rotating, without excessively penalizing the effective power surge of the thruster unit 12. Other values of $\beta$ could alternatively be recommended.

As shown in FIG. 1E, a plurality of holes on the proximal portions 14m and 14f of the plates 14a and 14b are used to select the desired angle $\beta$. Alternatively, as mentioned above, the plates can be oriented, in relation to one another, in the factory, by welding.

To connect the thruster subunits 12a and 12b to the course-correction secondary thrusters 19a and 19b and thus allow curved trajectories, the support means 14 of a device according to the disclosure, cooperate with secondary support means 15a and 15b for operating in conjunction with the course-correction secondary thrusters 19a and 19b and maintain them in a substantially parallel thrust orientation to a longitudinal axis of the platform 11. Thus, as described as a non-limiting example in FIG. 1E, the plates 14a and 14b can cooperate respectively with the arms 15a and 15b, or more generally with the lateral extensions. According to the FIG. 1E, the plates 14a and 14b have distal portions 14d, diametrically opposed to the proximal portions mentioned above. Like these, the distal portions have hollow circular sections substantially smaller or larger than that of the proximal portions 15ap and 15bp of extensions 15a and 15b. Thus, the plates and extensions can cooperate by means of an embedded connection, possibly achieved by welding, or by means of pins passing through through-holes made in said distal parts 14d of the plates 14a and 14b and proximal parts 15ap and 15bp of the extensions 15a and 15b. Thus, this latter configuration allows the relative orientation of the extensions in relation to said plates to be adjusted.

Each extension 15a or 15b has a distal portion 15ad or 15bd arranged to encircle or more generally to maintain a course-correction secondary thruster 19a or 19b. Preferably, such secondary thrusters can consist of one or more electrical turbines. Such technological choice provides a course-correction secondary thruster 19a or 19b that is particularly reactive, more than some thermal engines, such as turbojets.

However, an arrangement of the course corrector thermal thrusters 19a and 19b, could be in using of a turbo thruster, instead of each electric turbine, substantially oriented parallel to the thrusters of thruster subunits 12a and 12b. To maintain high reactivity, an orientable fluid outlet, of adjustable cone type of a fluid outlet of a jet ski, could cooperate with the gas ejection nozzle of the secondary thermal thruster. By orientating this cone in a median plane of the platform 11, it is achieved a result close to one conferred by the use of electric turbines.

When the body 10a of a propulsion device according to the invention comprises a processing means, not only instructions of passenger 1, but also of the attitude and/or trajectory sensors of the body 10a in space, the disclosure envisages using the presence of course-correction secondary thrusters 19a and 19b, to help the passenger maintain the course, especially if weather conditions are unfavorable. Indeed, a strong and gusty wind can cause the propulsion device on a winding path, contrary to the will of the passenger. This can be balanced with an instructions interface, as discussed below in relation to FIG. 2, but this balance may be fastidious in the long term.

The disclosure thus provides to adapt the processing means in the body 10a so that it develops throttle to the course-correction secondary thrusters 19a and 19b, so that these, in the absence of passenger instructions implying in any desired change of trajectory, maintaining the current course. For example, when a gust of wind tends to drive the propulsion device on a winding path to the right of the passenger, the processing means included on the body 10a, generate a power control to the course corrector secondary thruster 19b, so that is to say the one positioned to the right of the passenger 1, by activating the secondary thruster 19b sufficiently to cancel this unexpected path change. The course-correction secondary thruster 19b is switched off as soon as the nominal trajectory is recovered. In this way, the propulsion device 10 automatically maintains its current trajectory and discharges the passenger of any effort of balancing. The decision to prioritize the secondary electric thrusters is especially justified by this embodiment, because of the responsiveness required for such course-correction secondary thrusters 19a and 19b so that it compensates for meteorological disturbances, without the passenger's knowledge.

Furthermore, the embodiment of the thrust unit 12 supported by the support means 14 of a device 10 described on FIG. 1E, presents the support means 14 with the extensions 15a and 15b having a pair of protrusions or spacers 15p and 15s respectively.

The latter are positioned according to a normal axis to the longitudinal axis of each extension 15a or 15b to cooperate with platform 11. The latter can thus be fixed by screwing, said protuberances being threaded in this case. Any other way of jointly cooperation between the support means 14 and the platform 11 could be envisaged according to the disclosure.

According to FIG. 1E, the protrusions 15p and 15s are positioned respectively on extensions 15a or 15b respectively near the distal and proximal portions of the extension. In addition to having a function of assembly with the platform 11, these protrusions allow to determine the relative height of the surfaces 11a created on the platform 11 to receive the passenger 1's feet relative to the center of gravity CG of the body 10a of the propulsion device 10.

It was determined after confidential private tests and prototyping, that the relative height of surfaces 11a related to the center of gravity CG10 of the body 10a affects the maneuverability of the propulsion device 10. Thus, as shown in FIG. 1C in particular, it is suitable to arrange the platform 11 so that the surfaces 11a have a height hp relative to the low point B (determined by the distal portions of the protrusions 17) of the body 10a of the device 10, when the passenger 1 occupies a substantially vertical position and the ejection nozzles of the thrusters of thruster subunits 12a and 12b are oriented towards the ground:

substantially equal to or greater than the height h10, relative to said low point B, of the center of gravity CG10 of the body 10a of the device 10, and less than the height h, relative to said low point B, of the center of gravity CG of the assembly including the device 10 and the passenger 1.

Thus, the respective heights of the protrusions 15p and 15s help to adjust this configuration by regulating the height hp.

The surfaces 11a located a few centimeters above the center of gravity CG10, as presented in FIG. 1C, provide excellent maneuverability to the propulsion device 10.

In order to supply fuel to main thrusters, that is the thrusters of thruster sub-units 12a and 12b, the disclosure provides that the fuel can be conveyed in one or more tanks not shown by the Figures for simplification purposes. As a non-limiting example, such a tank may comprise a rigid or flexible envelope, a filling opening and a drainage opening. It is thus possible to supply liquid or gaseous fuel to such a tank through the filling opening. As a non-limiting example, such fuel can be kerosene, currently commonly suitable for conventional thrusters. However, alternative fuels could be used. Said fuel is then supplied from this tank through the draining opening arranged to cooperate with a supply conduit, not shown for simplicity purposes in the Figures, whose ends are respectively connected to the reservoir, more precisely to the draining opening, for collecting the fuel and to a collection system, also not shown in the figures, for feeding the thrusters with fuel. Such collecting system supplies each of the thermal thrusters with fuel. It thus cooperates by fluid connection with these thrusters and the tank.

Such a tank can be designed to be carried by the passenger as a backpack or a parachute, with straps or harness, if possible Rallye type, to immediately drop the tank in case of fire.

Such type of harness is indeed deemed to comprise fasteners designed to be easily released by the person hampered in emergency situations. Such a tank may also comprise a flexible envelope to increase passenger comfort and reduce the risk of injury to the latter during a fall for example. A tank may alternatively or additionally be fixed to the platform 11 or on the support means 14 of the thruster unit. According to a preferred embodiment, when the tank is provided to be carried by passenger 1, the envelope of this tank may be flexible, such as a pocket degassed before being filled with fuel. Such choice enhances comfort and passenger safety in case of fall and in particular prevents any risk of unpriming the supply of the fuel to the thrusters.

The disclosure also provides that a source of electrical energy may be embedded in the main body 10a of a propulsion device 10. Such a source may consist of one or more batteries and/or photovoltaic cells, the latter serving as secondary sources for supplying low energy consuming electronics, such as the passenger's instructions processing means and preparation of power control of the thruster unit.

However, the course-correction secondary thrusters 19a and 19b presented above will require a more substantial source such as a battery or batteries, if these secondary engines are electric.

Figure 2:
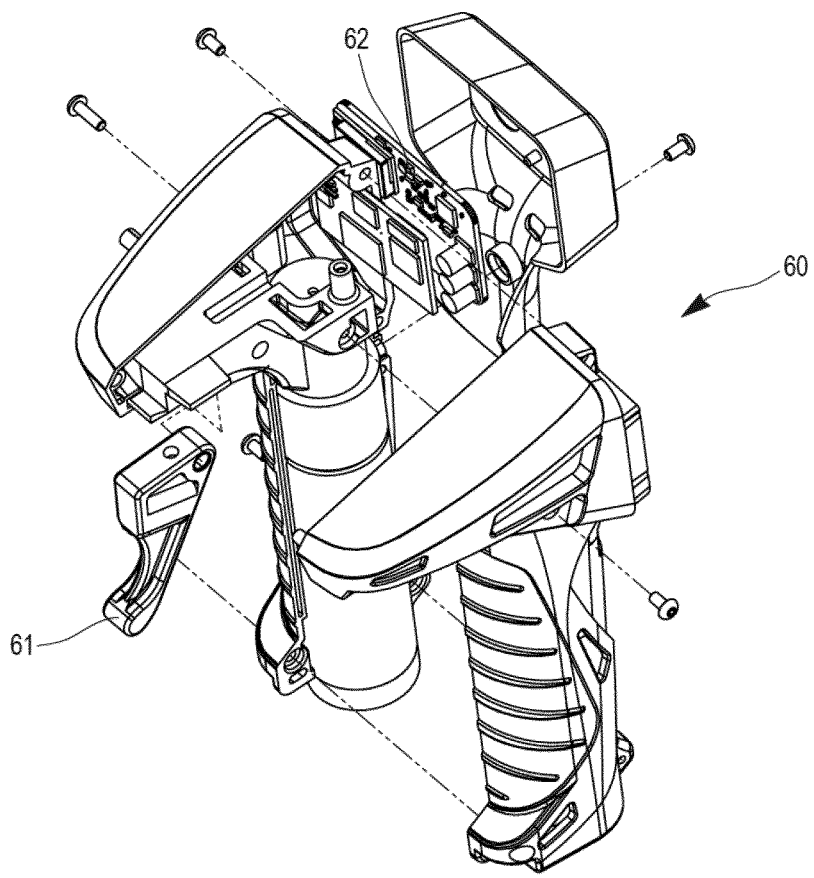
FIG. 2 illustrates an exemplary interface and processing system for a propulsion device constructed in accordance with the principles of the present disclosure.

In order to be able to control the power of the thrust system and also decide the trajectories of displacement, a passenger 1 of a propulsion device according to the disclosure may suitably use a man-machine interface of instructions, whose primary function is to translate a gesture of said passenger 1 into a specific instruction. FIG. 2 shows an example of such man-machine interface or controller 60, as a remote control having a housing that can be held in the hand of passenger 1 or the instructor during a training session. According to this non-limiting example, said interface 60 can be likened to a gun type remote control. It includes in particular a trigger 61, whose stroke can be interpreted as an instruction to increase the power of the thruster system 12 when the trigger is activated by the passenger 1 or by the instructor, and to reduce this power when such trigger is gradually released by the user. Such an interface 60 may also include other components such as one or more buttons, for example pushbuttons, not shown in FIG. 2, possibly to establish instructions to start or stop the thrust system 12, in order to cut off the supply to one thruster or another.

This interface 60 may further comprise one or more sensors such as a gyroscope, an inclinometer, or an angle measurement sensor measuring the angle described by a wrist of the user whose hand is holding the interface 60 relative to the longitudinal axis of the forearm concerned compared to a reference position in which the hand of said user is aligned with his forearm. The angle may measure a rotation or angular displacement along a longitudinal axis of the housing of the interface 60, which would run substantially perpendicular to an axis of a forearm of the operator when held at the operator's side. Thus, the wrist moving towards the inside of the user's body can mean the wish for rotating the device 10 to the left, if the user interface 60 holds it in his right hand. Conversely, a movement of the wrist movement to the exterior could mean the will to direct the trajectory of the device 10 to its right. In other words, rotational movement of the interface 60 can be used to implement yaw and/or combined yaw/roll control aspects of the device 10, for example, via controlling operation of the primary and/or secondary thrusters 19a, 19b.

Alternatively or in addition, the interface 60 may comprise an inclinometer. An inclination of said interface 60 towards the left or towards the right by the user can then be translated into an orientation instruction of a desired trajectory direction of the device 10. Such direction instruction is then translated by power commands secondary thrusters 19a and 19b described above. In order to interpret such gestures of the user, the interface 60, described by way of example in FIG. 2, comprises an electronic means 62 for processing different information collected by the trigger 61 and other buttons and/or sensors of the interface 60, in order to produce instructions that can be interpretable by the means of processing such instructions onboard the body 10a of the propulsion device 10. To route these instructions to this processing means, the interface 60 and said processing means present on the body 10a of the device comprise a wired or advantageously wireless communication means, for example via radio.

Said processing means, arranged to be advantageously positioned near the center of gravity CG10 of the body 10a, are arranged to generate power controls the thrust system 12 from instructions produced by the interface 60. Each power command is suitably conveyed to the related thruster by wired communications. Such communication system is not represented in the Figures for simplification purposes.

We can also mention that the information related to the operation of the thrust system may be processed by the processing means and output to the passenger 1 via one or more graphical interfaces 20a and/or 20b, such as screens or LEDs, advantageously positioned on the platform 11 as shown in FIG. 1D, by a non-limiting example, close to surfaces 11a.

To facilitate the ignition or starting the thrust system 12 of the propulsion device according to the disclosure, it may be advantageous to position the body 10a of this device so that the thrusters of the thrust sub-units 12a and 12b are oriented substantially horizontally. Indeed, fuel, such as kerosene, tends to flow prior to the ignition of the thrusters if it remained upright. The disclosure provides as such, a takeoff station arranged to enable to tilt body 10a when starting the thrust system 12, and to position the body 10a so that a passenger 1 can easily take over the surfaces 11a. Alternatively, the disclosure provides that the thrust system 12 may be rotatably mounted along an axis transverse to the platform 11 to enable a rotation of 90° and thus resolve the drawback of having to orient the body 10a if the thrust system 12 cooperate jointly via an embedded connection with the platform 11. After starting up of such a rotatably mounted thrust system 12, the latter will be held fixed in relation to said platform 11, as illustrated in FIG. 1A-1C, by any means.

The disclosure further provides a second embodiment of a propulsion device according to the disclosure, not represented in Figures by way of simplification. Indeed, the first and last example (described according to FIGS. 1A to 1E) is more intended for playful applications for which the agility of the driver and/or passenger(s) is often put to the test. To encourage more linear and less acrobatic movements, the disclosure provides the reinvention of the motorcycle as known today. Although structurally and physically different, such a second example of device is of similar design to that thereof described in conjunction with FIGS. 1A-1E.

Whatever the configuration of the body of such a propulsion device according to the invention, this device provides a large number of playful applications and/or services. The disclosure revolutionizes transportation as we consider it today and would not be limited only by the examples of use cited above.

Accessories to further enhance the playfulness or the operating conditions of such a device could also be made, especially in lighting, navigational aids, remote control with or without passengers, etc.

For example, such a device may include means for long-range communication to interact with a remote-control station, so that such station could generate interpretable driving instructions by electronic processing systems to the device in a suppletive manner. Alternatively, this electronic processing means may memorize movement coordinates, provided before a flight or during such a flight by the passenger, in order to produce the power commands delivered to different thrusters of the device and reach a destination without passenger's assistance. This electronic processing means can take advantage of the presence of a GNSS receiver, as mentioned above, to know at any moment the geographical position of the device 10 during its journey.

The disclosure also envisages the presence of any man-machine interface adapted to display to the passenger in a graphical, sound or kinesthetic way, information related to the operation of the propulsion device. A system for viewing said information incorporated into a visor of a crash helmet and/or for detecting operating instructions by analyzing the movements of the iris of one of the eyes of the passenger wearing such a helmet could, for example, be envisaged, as shown for example in FIG. 6.

As shown in FIG. 1F in connection with the non-limiting embodiment of a thrust system 12 in FIG. 1E, the disclosure also plans to add to part or all of the thrusters or thrust subunits 12a, 12b an orientable fluid outlet of a cone type for orienting a fluid outlet of a jet ski for example, that would cooperate with the gaseous flow ejection nozzle of the thruster(s) concerned. This applies to FIG. 1F, which describes two views, respectively front and side of an example of thrust system 12 having two thrust subunits 12a and 12b. Among the four thrusters, FIG. 1F features thruster 12b1, the nominal direction AL12b of gaseous flow ejection of which is shown by a dashed line.

We can see that the gaseous flow ejection nozzle of said thruster 12b1 cooperates with a movably mounted fluid outlet 12ex, such as an orientable cone, by means of a pivoting mechanical connection with an axis 12ax parallel to a transverse axis of the body 10a of a device 10 described in relation to FIG. 1A. Such an orientable fluid outlet can describe, in a median plane of the body 10a, an angle δ around the axis 12ax. Thus, whether a thruster of a thrust unit according to the invention is dynamically oriented or not, the processing means of the body of a propulsion device can be adapted to control an actuator of such adjustable fluid outlet in order to divert the fluid ejection direction of the thruster in particular by rotation around an axis parallel to a transverse axis of the body of the device. In this way, it becomes possible, without having to incline the thruster and/or the body of the propulsion device as such, to favor a forward movement of the device when such fluid outlet is directed towards the back thereof and vice versa. This function can be activated on demand by the passenger, for example by working an appropriate man-machine interface, like the device, known as TRIM, fitted to numerous outboard motors of boats, consisting in a jack positioned on the retaining bracket of the motor and controlled by a button or a trigger by the passenger of said boat. The TRIM effect is to dismiss or bring closer the motor of the boat's transom, in order to change the thrust angle of the motorized propeller and, consequently, the attitude of the boat.

Such adaptation of the fluid outlets of the thrusters of a propulsion device according to the disclosure, it is consistent with the first or second embodiments, favors straight-lined movements, as well as the speed of movement, of the propulsion device while maintaining a horizontally of the attitude of the body thereof.

Figure 3:
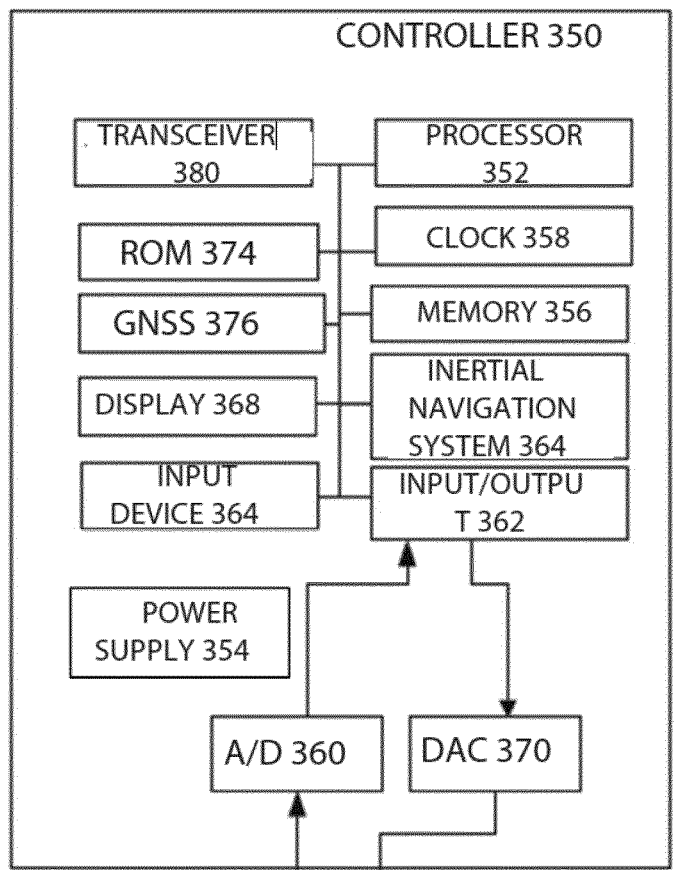
FIG. 3 illustrates an exemplary controller and processing system for a propulsion device constructed in accordance with the principles of the present disclosure.
Figure 3:
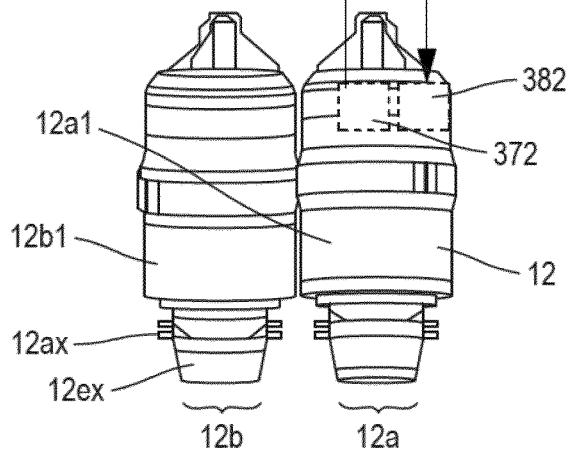

FIG. 3 illustrates exemplary processing means for the propulsion device according to the disclosure. In one aspect, the controller 350 may be implemented as a single control implementing one or more aspects of the propulsion device 10. In another aspect, multiple controllers 350 may be implemented with each implementing one or more aspects of the propulsion device 10. For example, individual controllers 350 may be implemented for each of the thrust system 12, subthrust units 12a, 12b, and each booster or thruster 12a1, 12a2, etc. of the propulsion device 10 (or combinations thereof). In one aspect, one controller 350 may be implemented for each secondary thrusters 19 of the propulsion device.

The controller 350 may receive sensor outputs from one or more sensors 372 and/or other sensors described herein, such as a temperature sensor sensing temperature from any part of the thrust system 12 and associated system, a pressure sensor sensing pressure from a part of the thrust system 12 and associated system, a position sensor sensing a position of a part of the thrust system 12 and associated system, an RPM sensor sensing rotations of the thrust system 12 and associated system, a fuel flow sensor sensing fuel flow to the thrust system 12 and associated components, a fuel pressure sensor sensing fuel pressure to the thrust system 12 and associated system, a vibration sensor sensing vibration of the thrust system 12, associated systems or components and the like. In a similar manner, the controller 350 may receive similar sensor outputs from one or more sensors from the secondary thrusters 19.

The controller 350 may include a processor 352. This processor 352 may be operably connected to a power supply 354, a memory 356, a clock 358, an analog to digital converter (A/D) 360, an input/output (I/O) port 362, and the like. The I/O port 362 may be configured to receive signals from any suitably attached electronic device and forward these signals from the A/D 360 and/or to processor 352. These signals include signals from the sensors 372. If the signals are in analog format, the signals may proceed via the A/D 360. In this regard, the A/D 360 may be configured to receive analog format signals and convert these signals into corresponding digital format signals. The controller 350 may include a transceiver 380 configured to transmit signals over a wired and/or wireless communication channel as defined herein.

The controller 350 may include a GNSS receiver and processor 376 that may estimate the location, velocity, heading, altitude, and the like of the device 10. The controller 350 may include an inertial navigation system 384 that may estimate the location, velocity, heading, altitude, and the like of the device 10. The inertial navigation system 384 may be implemented as a navigation aid that uses the processor 352, motion sensors, accelerometers, rotation sensors, gyroscopes, and the like to calculate via dead reckoning its location, velocity, heading, altitude, and the like without the need for external references. Moreover, the controller 350 may also include a terrain recognizing unit configured to capture a photo or visual indication of local terrain or geographical landmarks, recognize the terrain or one or more geographical landmarks, and determine a location of the device 10 based on the recognition of terrain.

The controller 350 may include a digital to analog converter (DAC) 370 that may be configured to receive digital format signals from the processor 352, convert these signals to analog format, and forward the analog signals from the I/O port 362. In this manner, the components 382 of the thrust system 12 configured to utilize analog signals may receive communications or be driven by the processor 352. The components 382 may include a fuel injection system for the thrust system 12, a nozzle control for the thrust system 12, fuel pumps, fuel valves, and the like. Similarly, the secondary thrusters 19 may receive communications or be driven by the processor 352 as well. In one aspect, the controller 350 may exclusively control the secondary thrusters 19 in order to control a yaw of the propulsion device 10.

The processor 352 may be configured to receive and transmit signals to and from the DAC 370, A/D 360 and/or the I/O port 362. The processor 352 may be further configured to receive time signals from a clock 358. In addition, the processor 352 may be configured to store and retrieve electronic data to and from a memory 356. The controller 350 may further include a display 368, an input device 364, and a read-only memory (ROM) 374. Finally, the processor 352 may include a program stored in the memory 356 executed by the processor 352 to execute a process of operating described herein.

The controller 350 and I/O port 362 may be configured to control operation of the thrust device 10 including the components 382 and receive signals from the thrust device 10. These signals may include signals from the sensors 372 and the like. Likewise, the controller 350 and I/O port 362 may be configured to control operation of the secondary thrusters 19 including associated components and receive signals from the secondary thruster 19.

The controller 350 may control operation of the thrust device 10, and the like. In this regard, when the sensors 372 sense a temperature, pressure, vibration, or the like of the thrust system 12 that is outside a predetermined operating range, the controller 350 may reduce fuel flow to the thrust system 12 to prevent damage, prevent a safety issue or the like. Additionally, the controller 350 may increase fuel flow to the remaining subthrust systems 12a, 12b and/or individual thrusters to compensate for the reduced thrust from the failing component of the thrust system 12. Likewise, the controller 350 may control operation of a secondary thrusters 19, and the like in a similar manner. In this regard, when sensors sense a temperature, pressure, vibration, or the like of a secondary thruster 19 that is outside a predetermined operating range, the controller 350 may reduce fuel flow to the secondary thruster 19 to prevent damage, prevent a safety issue or the like.

Additionally, in one aspect there may be redundant sensors 372. In this regard, the controller 350 may sample the outputs from each of the redundant sensors 372. Thereafter, the controller 350 may compare the outputs from each of the redundant sensors 372 and discard values that appear erroneous. Finally, the controller 350 may average the values of each of the remaining redundant sensors 372 to provide a statistically more accurate sensor value. This process reduces false positive errors and increases safety.

Figure 4:
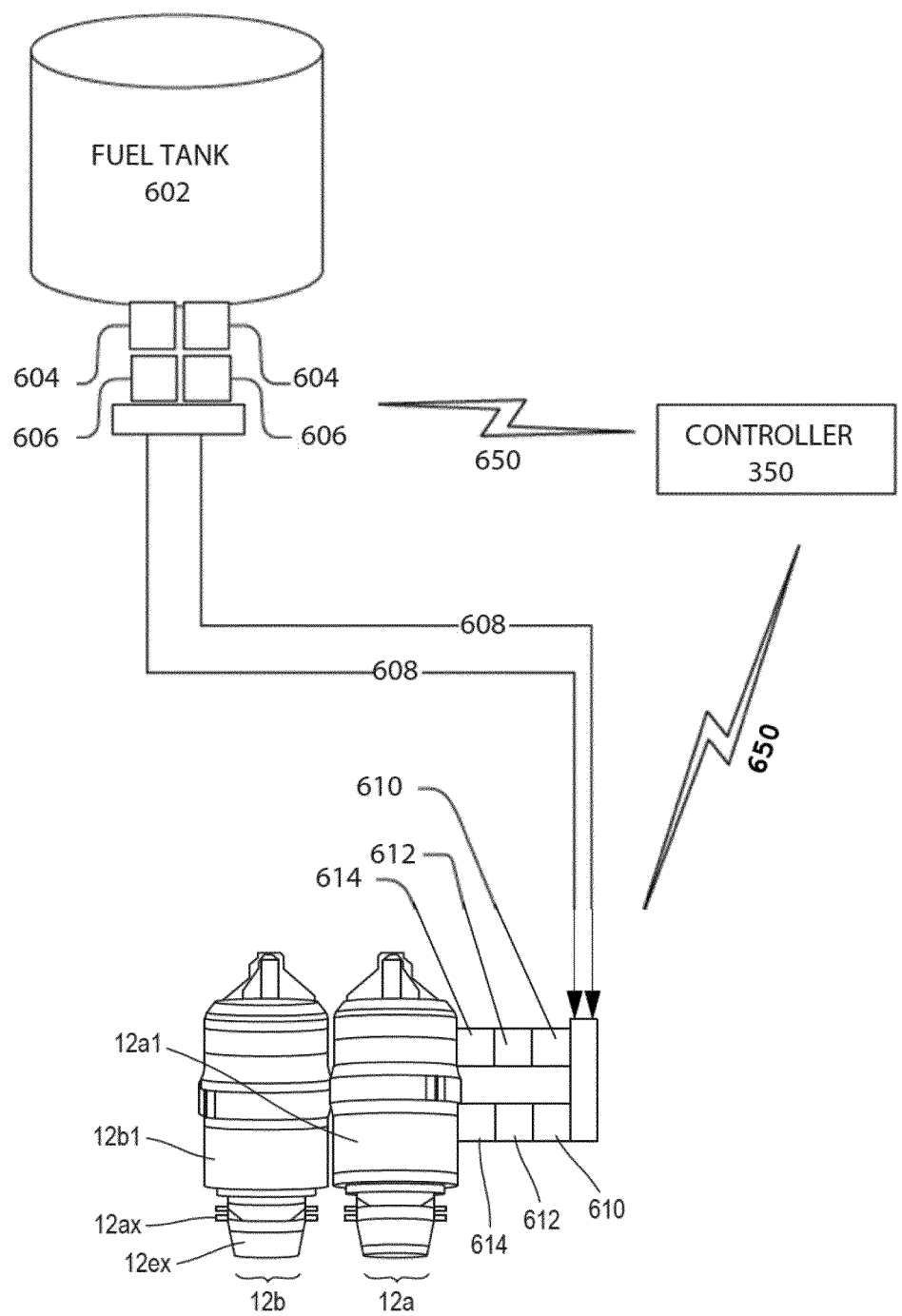
FIG. 4 illustrates various aspects of examples of redundant systems for a propulsion device constructed in accordance with the principles of the present disclosure.

FIG. 4 illustrates various aspects of redundant systems for the propulsion device according to an aspect of the disclosure. In particular, the thrust systems 12 described above may be implemented with a number of redundant systems to increase safety, reliability and the like. As schematically shown in FIG. 4, a fuel tank 602 may include at least two fuel pumps 604. The fuel pumps 604 may operate in parallel to deliver fuel from the fuel tank 602 to each subthrust units or systems 12a, 12b. In this regard, when one fuel pump 604 fails, the second fuel pump 604 may compensate for the failed fuel pump 604. Alternatively, each thruster or engine 12a1, 12a2, 12b1 . . . may be coupled to an individual, independently-controlled fuel pump to further increase operational redundancy, stability, and safety. Moreover, each fuel pump 604 may include a fuel flow sensor, a rotation sensor, or the like indicated at 606. The controller 350 may sense and control operation of each of the fuel pumps 604 based on an output from the one or more sensors 606 over a communication channel 650 as defined herein. Although the fuel pumps 604 are shown while directly included in the fuel tank 602, the fuel pumps 604 may be located anywhere between the fuel tank 602 and the propulsion device 10, more particularly the thrust system 12.

When the controller 350 senses that one fuel pump 604 has failed, the controller 350 may then operate the remaining fuel pump 604 in a manner to compensate for the failed fuel pump 604. Alternatively, one fuel pump 604 may operate and the second fuel pump 604 may operate in a standby fashion. When the controller 350 senses that the operating fuel pump 604 has failed, the controller 350 may then operate the standby fuel pump 604 in a manner to compensate for the failed fuel pump 604.

The redundant systems of FIG. 4 may further include a plurality of fuel lines 608. Implementing a plurality of fuel lines 608 ensures that if one fuel line fails to deliver fuel to the propulsion device 10, more particularly the thrust system 12, then a backup fuel line 608 may compensate for the fuel line 608 failure. This may address situations where the fuel line is clogged, is damaged, is kinked, and the like. Moreover, each fuel line 608 may include a fuel flow sensor 610. The controller 350 may sense and control operation of each fuel line 608 through operation of both fuel pumps 604 based on an output from the fuel flow sensor 610 to compensate for a failed fuel line 608.

The redundant systems of FIG. 4 may further include a plurality of fuel valve devices 612. Implementing a plurality of fuel valve devices 612 ensures that if one fuel valve device 612 fails to deliver fuel to the propulsion device 10, more particularly the thrust system 12, then a backup fuel valve device 612 may compensate for the fuel valve device 612 failure. Moreover, each fuel valve device 612 may include a failure sensor. The controller 350 may sense and control, over a communication channel 650 as defined herein, operation of each fuel valve device 612 based on an output from the failure sensor to compensate for a failed fuel valve device 612.

The redundant systems of FIG. 4 may further include a plurality of fuel injection devices 614. Implementing a plurality of fuel injection devices 614 ensures that if one fuel injection device fails to deliver fuel to the propulsion device 10, more particularly the thrust system 12, then a backup fuel injection device 614 may compensate for the fuel injection device 614 failure. Moreover, each fuel injection device 614 may include a failure sensor. The controller 350 may sense and control, over a communication channel 650 as defined herein, operation of each fuel injection device 614 based on an output from the failure sensor to compensate for a failed fuel injection device 614. The redundant feature may include having one controller 350 implemented for each sub-thrust system or unit 12a, 12b and/or each individual engine or thruster 12a1, 12a2, 12b1 . . . of the propulsion device 10.

Figure 5:
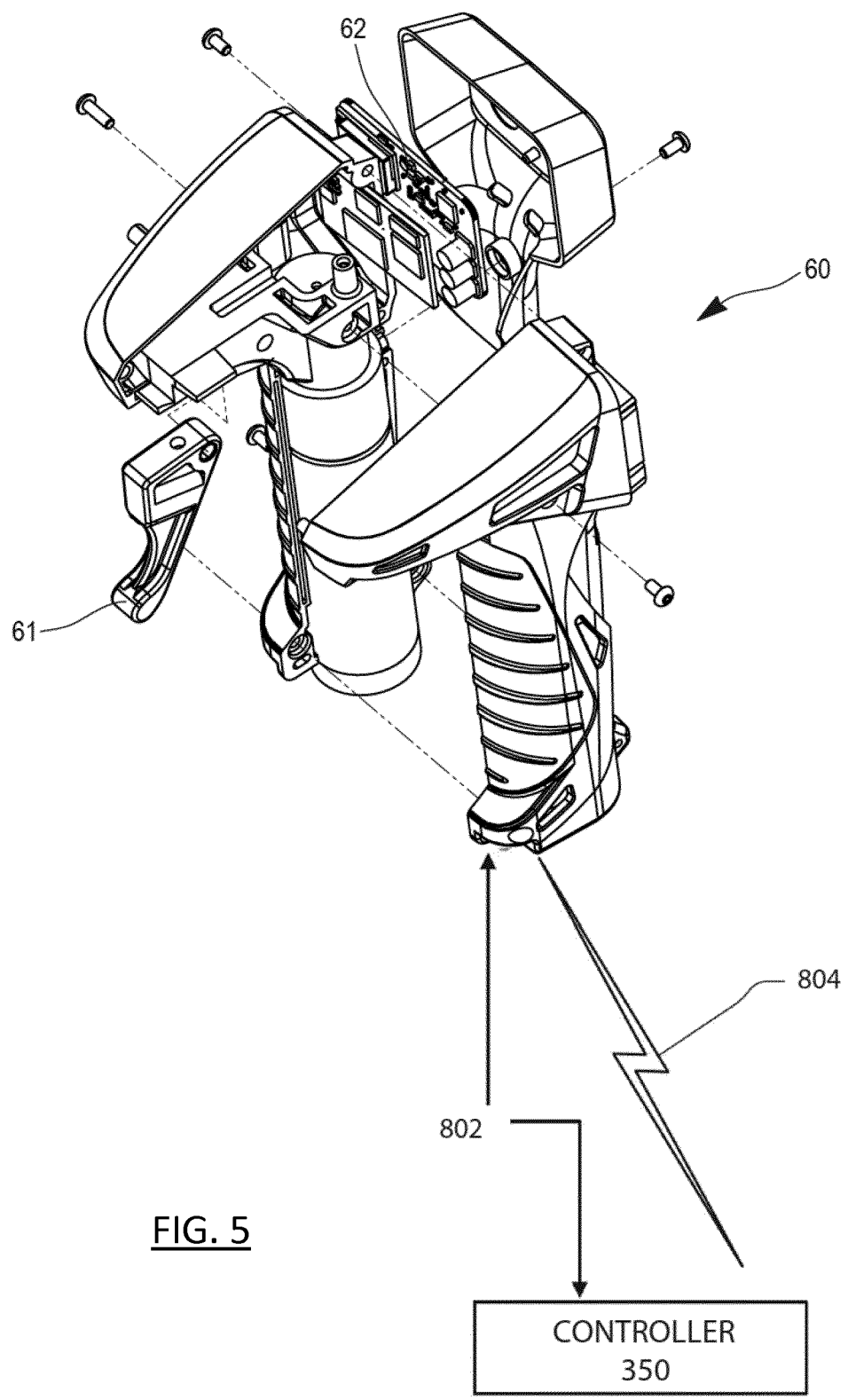
FIG. 5 illustrates various additional aspects of redundant systems for a propulsion device constructed in accordance with the principles of the present disclosure.

FIG. 5 illustrates various additional aspects of redundant systems for the propulsion device according to an aspect of the disclosure. In particular, FIG. 5 illustrates the man-machine interface 60 as a remote control to be held in the hand of passenger 1. In one aspect and as mentioned above according to FIG. 2, the interface 60 has a gun-type form factor having a trigger 61 whose stroke can be interpreted as an instruction to increase the power of the thruster unit 12 when the trigger is operated by the passenger 1. The man-machine interface 60 may also include a controller that includes one or more of the various aspects of the controller 350, as described in relation to FIG. 3.

In one aspect, the man-machine interface 60 and controller 350 may control yaw of the propulsion device 10 by controlling the secondary thrusters 19. In this regard, operation of the man-machine interface 60 may implement a percent rotation of the propulsion device consistent with movement of the man machine interface 60 determined by sensors, described above, included with the man machine interface 60. In other words, movement of the man-machine interface 60 in the hands of the passenger 1 may control a percent rotation or yaw of the propulsion device.

The man-machine interface 60 may communicate various control operations received from the passenger 1 by a wired communication channel 802 as defined herein to the controller 350. Redundantly, the man-machine interface 60 may communicate various control operations received from the passenger 1 by a wireless communication channel 804 as defined herein to the controller 350. Accordingly, should one of the wired communication channel 802 or the wireless communication channel 804 fail, the other one the wired communication channel 802 or the wireless communication channel 804 may be utilized providing increased safety. In one aspect, the signaling provided by the wired communication channel 802 and the wireless communication channel 804 may include pulse width modulation. Other types of signaling may be contemplated as well. In one aspect, signals may be generated by the man-machine interface 60 in response to Hall effect sensors associated with the trigger and/or other input devices. Other types of sensors and inputs may be contemplated as well. The controller 350 may utilize the redundant wired/wireless controls for any other sensor or control function in the propulsion device.

The man-machine interface 60 may include other form factors and implementations as well. For example, the man-machine interface 60 may include foot input that may allow the passenger 1 to control various aspects of the propulsion device via movement of their feet. In particular, the propulsion device 10 may include one or more control inputs or sensors 34 on the platform 11 proximate to the support means 16 where an operator's feet will be positioned. The sensors 34 may be positioned on the platform directly under the operator's feet and/or on the side of the feet (e.g., such as on the support means 16 or on a raised ledge or surface of the platform) to measure a lateral or partially-lateral force or pressure exerted by a side of each foot. The sensors 34 may measure, monitor, or otherwise assess a force, pressure, or other input from the operator's feet that can be communicated to other components of the device, such as controller 350, to adjust an operation of the primary and/or secondary thrust systems or thrusters. In one example of such an operation and adjustment, the sensors 34 may measure or monitor a force or pressure of a first foot of the passenger, such as the left foot, and measure or monitor a force or pressure of a second foot of the passenger, such as the right foot. The measurements from the first and second feet may be compared to determine or calculate a difference, if any, there between. The calculation may be performed, for example, by a CPU or other component of the sensors 34 and/or the controller 350. The calculated or determined differential in measured force or pressure may then be used to trigger or initiate an adjustment of the primary and/or secondary thrust systems or thrusters. In one aspect, the device 10 may have a preset differential threshold that is compared to the determined measurement differential, and an adjustment of the thrust systems is only performed if the measured differential is greater than, or alternatively, less than, the preset differential threshold. Upon comparison, a direction, fuel flow, thrust output, or other adjustment to the primary and/or secondary thrust systems or thrusters may be performed to affect a speed, direction, yaw, roll, and/or pitch of the device.

Configuration of the sensors 34 may include a four-sensor construct, where there is a sensor 34 for each toe region and heel region of each foot, which enables both left and right foot total differentiation as well as pressure and/or force monitoring of each toe and heel segment and differentials there between (e.g., monitor a difference between a left toe region and a right heel region, which may be indicative of a pivoting movement of the operator), thereby allowing the controller to be configured and programmed to modify flight and/or thrust output to accommodate, facilitate, or enhance hands-free steering and operation of the device 10 through physical movement and body shifting of the operator.

In an illustrative example of use, an operator may be positioned on the platform 11 for operation, and the primary and secondary thrust systems may be operated as disclosed herein to achieve flight. During flight, the operator may wish to steer or head in a direction to the left of the current heading. The operator may intuitively lean to the left, placing more pressure and weight on the left foot compared to the right foot. Depending on the weight and foot size of the operator, the difference in pressure exerted by the operator's left and right feet, and thus measured by the sensors, may be between approximately on psi and four psi, while a measured weight or force difference may be between approximately one-fourth to the full body weight (plus any additional gear, instruments, weapons, or the like that the operator is carrying). Upon detecting this force or pressure differential, the controller 350 may adjust operation of the primary and/or secondary thrust systems to facilitate a stable turn towards the left. Thrust output of one of the primary sub-thrust systems may be increased (or directed in a different direction) to provide additional lift on the left side of the device to account for the increased force and to prevent excessive roll or tipping over. In addition, and/or alternatively to the primary thrust system 12 modification, the secondary thrust system 19 may be adjusted to provide a controlled yaw rate of rotation or change of direction to the left. Upon completing the turn or achieving the desired new direction heading, the operator may balance himself (or herself) back on both legs substantially equally, thus reducing the measured differential between the left foot and right foot (or portions thereof). The reduced measurement differential may thus signal the controller 350 and/or primary and secondary thrust systems 12 or 19 to revert to normal operation or to otherwise operate to maintain the current heading and orientation of the device.

The scope or volume of adjustment of the primary and/or secondary thrust systems may be proportional to or otherwise correlated with a magnitude of the measured or calculated differential so that larger measured differentials result in larger adjustments of thrust output, direction, or the like to compensate, offset, or facilitate the interpreted action, instruction and/or force exerted by the operator. The correlated magnitude of the measured differential and the corresponding adjustment may be linear, may include a multiplier or quotient relationship, or may otherwise be mathematically or calculatingly related as needed or desired for a particular application or use of the device.

In addition to and/or as an example of the various level, attitude, yaw, and other orientation and/or flight characteristic sensors disclosed herein, a sensor may be coupled to at least one of the operator 1, the device 10, or the interface 60 to measure a rate-of-change of direction in one or more planes of movement, such as a yaw rate. The sensor may communicate with the controller 350 to affect adjustment or operation of the primary and/or secondary thrust systems to limit a maximum experienced rate-of-change of direction (for example, to prevent excessive spinning which could destabilize or injure the operator) and/or to reduce the rate-of-change to substantially zero once a desired heading or direction of flight is achieved. For example, as described above, the device 10 may monitor force or pressure differential as an indicator and steering input form the operator. Once the operator ceases the body movement or stands upright to signal a desired heading, the device 10 may still be experiencing a yaw rate that would otherwise cause the device 10 to deviate from the desired heading. Accordingly, the controller 350 can monitor or receive information from the sensor (standing alone and/or in conjunction with information received from other sensors) to counteract an existing yaw rate or other rate-of-change of direction by adjusting operation of the primary and/or secondary thrust systems to reduce the rate-of-change of direction and to stabilize or otherwise maintain a set heading and orientation of the device 10.

In another aspect, device 10 may include verbal or mouth inputs that allow the passenger 1 to control various aspects of the propulsion device via movement of their jaw and/or using voice recognition commands. For example, the device may include an oral input device 38 that is operable to receive an input and/or measure or monitor an oral condition, force, or pressure, and to communicate the received input to the controller 350 for subsequent processing, analysis, or other assessment that can then be used as at least a partial basis to operate, maintain, or adjust one or more features or components of the device 10. For example, the oral input device 38 may include one or more of a microphone, bite force or pressure sensor, and/or optical or other sensors monitoring an opening width or movement of the mouth and/or jaw. According to an embodiment described in relating to FIG. 6, the oral input device 38 may be coupled to the helmet 904 in proximity to the operator's mouth for operation thereof.

In an example of use, the input device 38 may receive or measure an input provided by an operator. The input may include an increased force or bite pressure placed on the input device 38, an oral command spoken into the input device 38, an increased (or decreased) opening of the mouth, and/or physical movement of a portion of the operator's jaw. The input received by the input device 38 may be processed or communicated to the controller for analysis or processing to determine whether an operational change to the device 10 should be initiated. For example, the bit force or pressure may be compared to a preset threshold value, and if the measured value deviates sufficiently from the threshold value, the controller may implement an adjustment of the primary and/or secondary thrust systems, which may include increasing or decreasing thrust output, changing thrust direction, modifying fuel flow to one or more thrusters or engines, or the like.

The scope or volume of adjustment of the primary and/or secondary thrust systems may be proportional to or otherwise correlated with a magnitude of the input received by the oral input device 38 so that input of larger magnitude (whether bite force, speech volume, mouth opening or movement) results in larger adjustments of thrust output, direction, or the like. The correlated magnitude of the measured differential and the corresponding adjustment may be linear, may include a multiplier or quotient relationship, or may otherwise be mathematically or calculatingly related as needed or desired for a particular application or use of the device.

In these implementations a benefit of using non-hand related inputs allows the passenger 1 freedom to use their hands for other tasks. In one aspect, a maintenance worker may be able to use their hands to perform maintenance. An additional example may include coupling one or more controllers or aspects of the interface 60 used to control aspects of the device 10 directly to a weapon or tool that the passenger/operator 1 of the device 10 is holding. Other applications and variations are contemplated as well.

Figure 6:
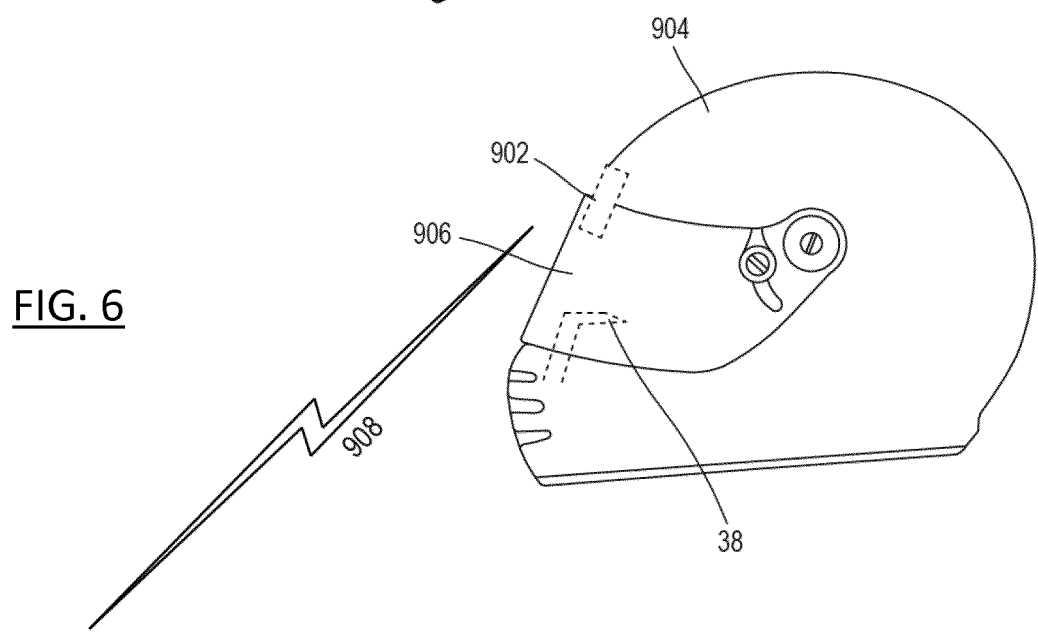
FIG. 6 illustrates a display and control input device for a pilot of a propulsion device constructed in accordance with the principles of the present disclosure.

FIG. 6 illustrates a display device for the pilot of the propulsion device according to an aspect of the disclosure. In particular, FIG. 6 illustrates a display device 902 configured to display operating information to the user. In one aspect, the display device 902 may be attached to an exterior surface of a helmet 904. In another aspect, the display device may be attached to an interior surface of the helmet 904. In yet another aspect, the display device 902 may be attached to a visor 906 of the helmet 904. In one aspect, the display device 902 may be implemented as a Heads-Up Display (HUD) that may include an optical collimator system that includes a convex lens or concave mirror with a Cathode Ray Tube, light emitting diode, or liquid crystal display at its focus. In one aspect, the HUD may display on the visor 906. In another aspect, the display device 902 may be directly viewed and may be implemented by light emitting diodes, a liquid crystal display, and the like. In one aspect, the display device 902 may be arranged in the upper part of the field of view of the pilot to allow the pilot to view the ground more easily.

The display device 902 may display information provided by one or more of the sensors described herein, including without limitation, any one or more of airspeed, altitude, a horizon line, heading, turn/bank, slip/skid indicators, engine status, safety warnings, safety alerts, engine failure, wireless transmission failure, excessive vibration, excessive heat, imminent engine failure, low fuel, throttle position, and the like. The information provided by the display device 902 may be provided from the controller 350 via a wired connection or wireless connection 908 utilizing a communication channel as defined herein.

An aspect of the disclosure relates also to a process for the propulsion, in a process for automated operation of the propulsion device. The process for automated operation may be controlled by the controller 350 based on preloaded instructions to the memory 356. Alternatively, the automated operation may be controlled by input to the input device 364 in the field of operation. Alternatively, the process for automated operation may be controlled by wireless communications received by the transceiver 380 over a communication channel as defined herein.

The propulsion device as described herein, is very lightweight and may be carried by personnel as needed. In this regard, the propulsion device may include a lightweight housing to house and protect the propulsion device while the personnel move it from location to location. For example, during military operations, military personnel may carry the propulsion device for use in quick evacuation of military personnel such as during military operations. If a soldier is injured during the military operation, the propulsion device may be removed from the housing and quickly operated to remove the injured soldier. In one aspect, the propulsion device may include the necessary medical equipment to provide immediate medical care to the soldier such as intravenous solutions, wound care, and the like.

In another aspect, as a first step of a process for automated operation, the propulsion device may be sent to a desired location via GNSS, inertial guidance system, terrain recognition or the like. In this regard, if a soldier is injured, the propulsion device may be sent to their location in an unmanned or remote-piloted fashion. Then, as a second step of a process for automated operation, the propulsion device may receive an occupant once it reaches the desired location or once it is removed from its housing. In one aspect, the configuration of the propulsion device may include a stretcher type configuration. This configuration may allow the passenger to be seated or lying. Thereafter, as a third step of a process for automated operation, the propulsion device may be sent to a safe location. In this regard, once a passenger is loaded into the stretcher configuration of the propulsion device, the man-machine interface 60 may be actuated to move the propulsion device to a safe location. In this regard, if the propulsion device is being used for medical evacuation during military operations, it may be prudent to move the injured soldier as quickly as possible from the battlefield to prevent further injury. Moreover, sending the propulsion device quickly away from a particular battlefield location may allow for the GNSS 376 to obtain an accurate location. For example, battlefield locations often are subjected to satellite location jammers. Immediately, sending the propulsion device to an altitude of several thousand feet will avoid the satellite location jammers and allow the GNSS 376 to obtain an accurate location. In another aspect, the propulsion device may utilize the inertial navigation system 384 or terrain recognition to head toward a safe medical facility which may allow the GNSS 376 time to obtain an accurate location away from satellite jamming devices. Finally, as a fourth step of a process for automated operation the propulsion device may be sent to a location via GNSS, inertial guidance system, or the like. In this regard, once the propulsion device receives an accurate satellite location, the controller 350 may control the propulsion device to move to a medical facility where the injured personnel may receive a medical care.

Now referring to FIGS. 7A-7D, an example of a thrust unit 100 with a selectively controllable multi-axis thrust output is shown. The thrust unit 100 may generally include or embody a turbojet engine, a turbofan engine, and/or a turboprop engine, or variations thereof providing thrust through combustion and fluid flow principles. The thrust unit 100 may be implemented with any of the personal propulsion devices and associated components, systems, and operations disclosed herein. The thrust engine 100 may, for example, be implemented into the propulsion device 10 or examples and variations thereof as a thruster unit 12a1, 12a2, 12b1, 12b2 or the like providing thrust to the device 10.

The thrust unit 100 may generally include or define an intake end or region 102 where air or other fluid is entrained into the engine, and a thrust output or exhaust end or region 104 where compressed, combusted, and/or pressurized fluid is ejected to generate thrust. The thrust engine 100 may include or define a nozzle 106 proximate the thrust output region 104, where the nozzle 106 is movably coupled to the thrust engine 100 such that the nozzle can move—and direct thrust output—along two separate axes, a first axis 108 (e.g., "Y"-axis) and a second axis 110 (e.g., "X"-axis) substantially perpendicular to the first axis. The pivotability about the two axes may be implemented or accomplished by a collar 111 that is pivotably coupled to the thrust engine 100 at a first joint 112a providing pivotability of the nozzle 106 about the first axis 108, and second joint 112b linking the nozzle 106 to the collar 111 that provides pivotability of the nozzle 106 about the second axis 110. The collar 111 includes a downward deflection towards the second joint 112b, and further includes a recessed or cut-out segment 114 just under the first joint 112a to provide the multi-axis maneuverability.

Selective adjustment of the position of the nozzle 106 may be achieved through the operation of one or more actuators coupled to the thrust engine 100 and/or the propulsion devices disclosed herein. For example, a first actuator 116a may be coupled to the nozzle 106 through a first armature or linkage 118a to control movement of the nozzle 106 about the first axis 108. A second actuator 116b may be coupled to the nozzle 106 through a second armature or linkage 118b to control movement of the nozzle 106 about the second axis 110. The actuators may be powered or operated pneumatically, electrically, hydraulically, or otherwise to provide the controlled movement and manipulation of the nozzle 106. The actuators 116a, 116b may be coupled to or otherwise in communication with the controllers, processors, or other components disclosed herein that provide for the controlled operation of the personal propulsion devices of the present disclosure.

Figure 7A:
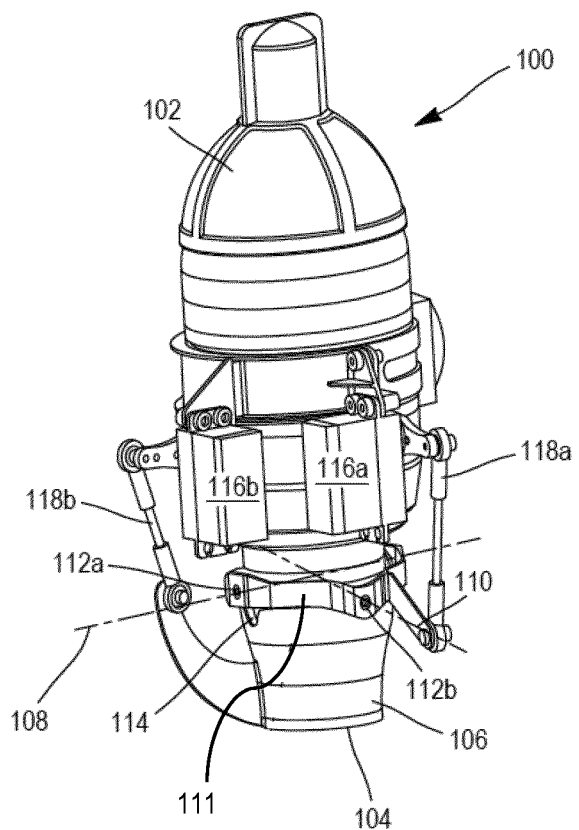
FIGS. 7A-7D illustrate an example of a thruster unit/engine system constructed in accordance with the principles of the present disclosure.
Figure 7B:
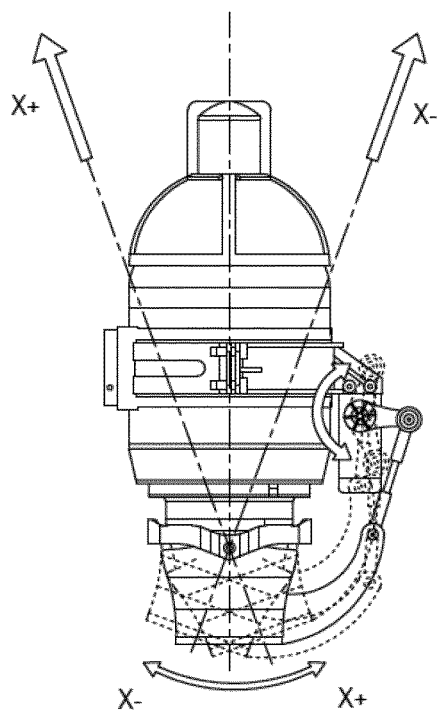
Figure 7C:
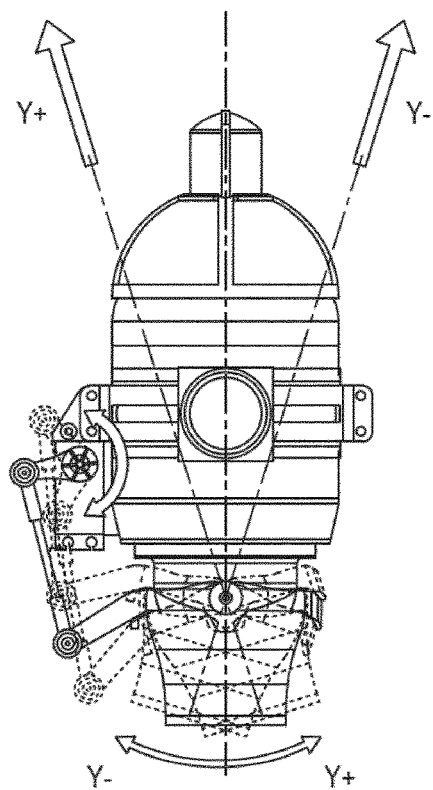

Movement of the nozzle 106 about the engine 100, and the resulting thrust vector indicated by an arrow is illustrated about the second axis 110 ("X"-axis) in FIG. 7B. The total range of movement of the nozzle 106 may be between approximately 15 degrees and approximately 60 degrees, e.g., from −7.5 degrees to +7.5 degrees with respect to a centerline axis, up to −30 degrees to +30 degrees with respect to a centerline axis. Other angular ranges may be implemented or tailored for particular applications or devices. Movement of the nozzle 106 about the engine 100 about the first axis 108 ("Y"-axis) and the resulting thrust vector indicated by an arrow is illustrated in FIG. 7C. The angular range of motion of the nozzle 106 about the first axis 108 may be substantially similar to that of the range of motion about the second axis, e.g., between approximately 15 degrees and approximately 60 degrees.

Figure 7D:
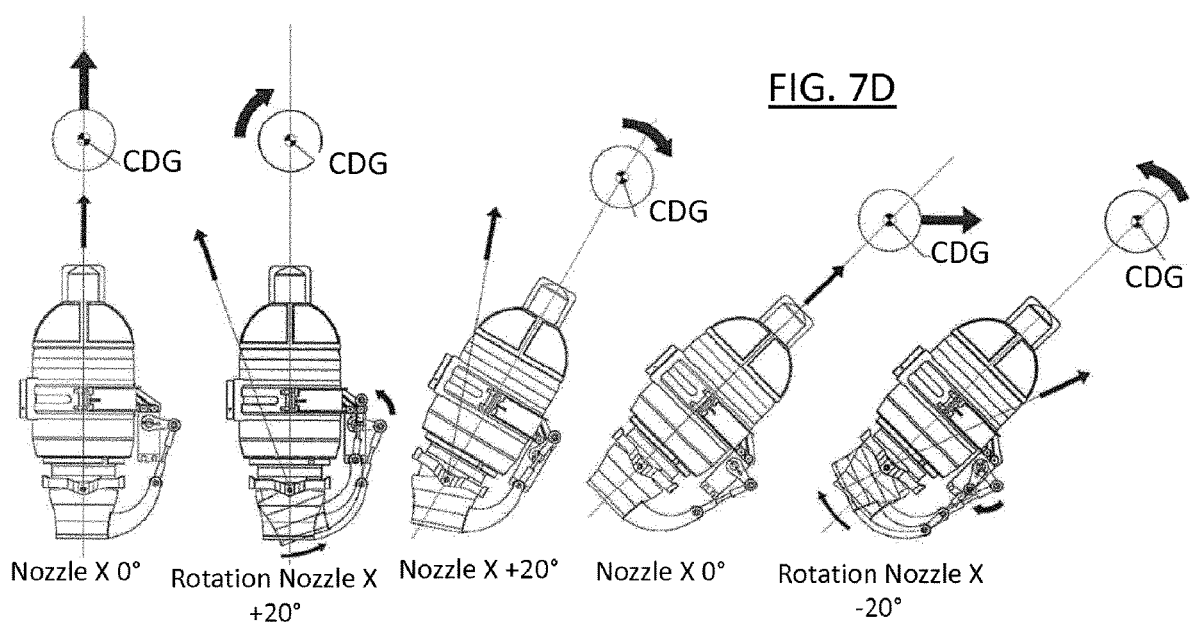

The multi-axis movement of the nozzle 106 can provide varying thrust vectors to provide varying directional control when implemented with the propulsion devices disclosed herein, examples of which include a passenger or payload situated above the platform 11 and thrust systems of the device. For example, FIG. 7D illustrates a plurality of varying angular positions of the nozzle 106 with respect to the X-axis (which reflects an angle about which the device would pitch in this example) and the thrust engine 100, the resulting thrust vector illustrated by an arrow along an axis of the nozzle, and the resulting movement of the device with the passenger or payload, represented by a circle and indicated by reference to a center of gravity "CDG" of the device and payload. In an example where the nozzle 106 is aligned with the centerline of the engine 100, e.g., a 0-degree orientation, the thrust output would not create any angular movement or change in pitch about the x-axis. In an example where the nozzle 106 is oriented approximately +20 degrees with the centerline of the engine 100, the thrust vector would impart a forward pitch about the x-axis, as indicated by the rotating arrow about the center of gravity "CDG" of the device and payload. FIG. 7D also illustrates examples of resultant thrust vectors and movement of the device with the passenger or payload when the engine 100 is angled away from a vertical orientation, and the nozzle 106 is either aligned with or angularly positioned with respect to the engine 100.

Now turning to FIGS. 8A-8D, an example of a personal propulsion device 200 is illustrated that may include features and operational characteristics disclosed herein, including with respect to the example of the propulsion devices 10, for example shown in FIGS. 1A-1E, and the control/input features shown and described with respect to FIG. 2 through FIG. 6. The device 200 generally includes a platform 202 configured to support a passenger 1 thereon, with a thrust system or assembly 204 coupled to the platform to provide movement and flight. Though shown as configured to support a single passenger, the platform may vary in size, shape, and configuration to support multiple passengers, instruments, cargo, tools, or other cargo for a particular application and use.

The device 200 may include a passenger support frame 206 to provide a structure that a passenger 1 can grasp or otherwise hold onto while operating the device 200, thereby reducing the need to have fixed leg or feet bindings coupling the passenger to the platform 202. The device 200 thus allows a passenger to simply step onto and off of the device for operation, without needing to remove or unbind leg/feet fixtures. The frame 206 also provides a mechanical leveraging element allowing a passenger to impart a rotating or steering force onto the device using the passenger's arms, rather than solely limiting physical steering and manipulation of the device 200 to the user's feet and legs, as may be the case with the example of the device 10 shown in FIGS. 1A to 1E. Operation of the device 200 may thus be less fatiguing through the use of exerting force on the frame 206 with the passenger's arms, which is then amplified by the length of the frame as a torque arm to impart a rotation, pitch, roll, or other directional control of the device.

The device 200 may include user input controls/machine interface 208 mounted onto a portion of the device, such as an upper section of the frame 206, that is readily accessible to the passenger 1. The interface 208 may include components and features similar to those described with respect to interface 60 and/or as otherwise described with respect to the monitoring, measuring, and operation of propulsion device features disclosed herein. The device 200 may also include the various other sensors and operational components and the resulting propulsion device characteristics and features described herein and illustrated in any of the figures.

Figure 8A:
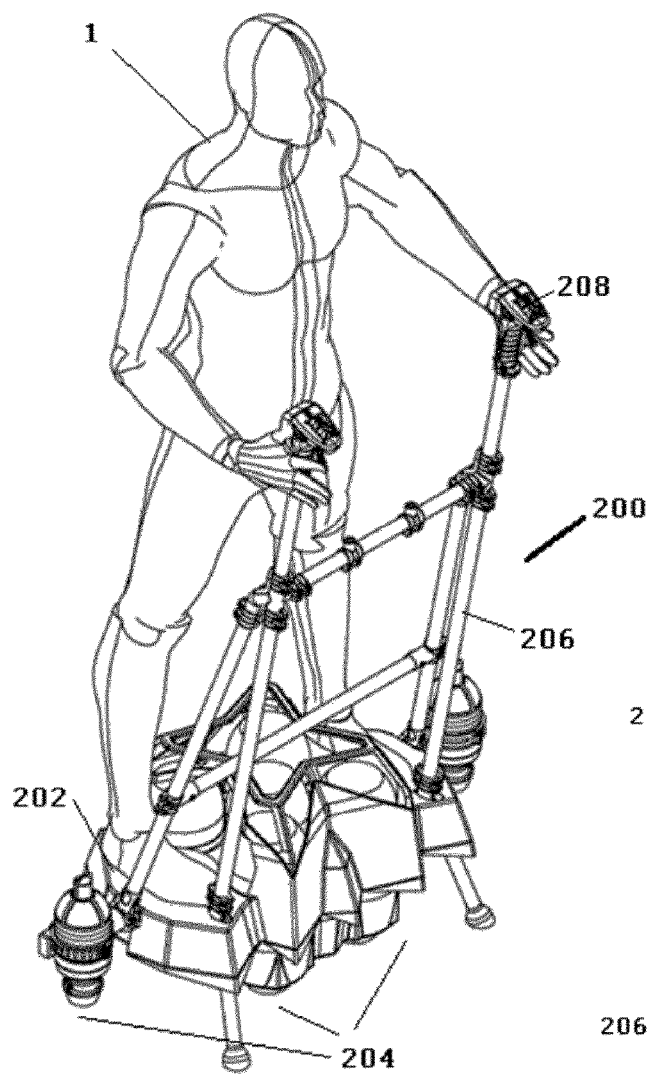
Figure 8B:
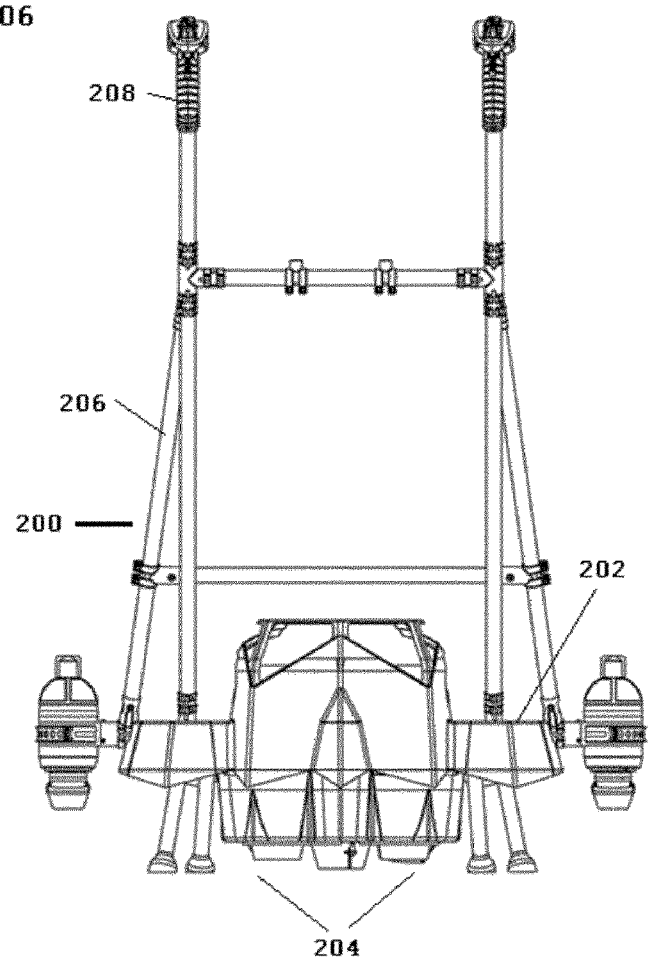

The thrust assembly 204 of the device 200 may include a plurality of thruster units to provide thrust and directional movement. For example, as shown in FIGS. 8C-8D (in which portions of the device 200 have been removed for simplicity and clarity of illustration), the thrust assembly 204 may include a primary thruster 204a located substantially in the center of the device 204 to generally provide thrust along a vertical centerline axis of the device 200. The primary thruster 204a may include multi-axis thrust control to provide controllable thrust output and resulting thrust vectors along multiple axes of travel and orientation of the device 200, as shown by the arrows in FIG. 8D. The primary thruster 204a may, for example, include the multi-directional thrust control shown and described with respect to FIGS. 8A through 8D.

The thrust assembly 204 may include a first pair of thrusters 204b1, 204b2, with each engine located on opposite sides of the primary thruster 204a along an axis 210. Each of the thrusters 204b1 and 204b2 may include directional thrust output capabilities at least along a direction substantially perpendicular to the axis 210 through a pivotable nozzle or the like (and may include multi-axis thrust control, similar to that described above), as shown by the arrows in FIG. 8D, to primarily affect changes in pitch and roll.

The thrust assembly 204 may include a second pair of thrusters 204c1, 204c2, with each thruster located on opposite sides of the primary thruster 204a along an axis 212 that is substantially perpendicular to the axis 210. Each of the thrusters 204c1 and 204c2 may include directional thrust output capabilities at least along a direction substantially perpendicular to the axis 212 (and may include multi-axis thrust control, similar to that described above), as shown by the arrows in FIG. 8D, to primarily affect changes in pitch and roll. The first and second pairs of thrusters may be clustered substantially around the vertical centerline of the device 200, thereby substantially circumscribing the primary thruster 204a within relatively close proximity.

The thrust assembly 204 may include one or more thrusters 204d1, 204d2, with each thruster located on opposite sides of the primary thruster 204a along an axis 214 that extends substantially along a longitudinal axis of the device 200 that is angled at approximately 45 degrees with respect to each of the axes 210 and 212. Each of the thrusters 204d1 and 204d2 may include directional thrust output capabilities at least along a direction substantially perpendicular to the axis 214 (and may include multi-axis thrust control, similar to that described above), as shown by the arrows in FIG. 8D, to primarily impart or control yaw movement. The thrusters 204d1, 204d2 may be positioned on opposite sides of the first thrust engine at a distance greater than a distance between the thrusters 204b1, 204b2, 204c1, 204c2 to impart a greater torque arm on the device 200 to control yaw rates.

The compositional and placement of the thrust assembly 204 as shown and described provides multi-axis control and redundancy in the case of a failure of one or more of the thrusters. Each of the aforementioned thrusters may, for example, be one of a turbojet engine, a turbofan engine, and a turboprop engine, and may further include any of the directional and/or output control features described herein. Moreover, each of the aforementioned thrusters may be oriented in a substantially vertical direction, as illustrated, to provide vertical take-off and landing capability, as well as the other flight features provided herein. Control of the directional thrust output of the various thrusters described above may be achieved through the use of one or more actuators, controllers, and or processors as described herein, and may be adjusted automatically in response to various detected, measured, and/or sensed parameters to provide flight features as also described herein.

Now turning to FIGS. 9A through 11C, examples of thrust systems 300 for propulsion devices, such as those disclosed herein or otherwise, are shown that provide significantly improved throttle response characteristics compared to typical throttle responses involved with combustion or jet engines alone. For example, turbine engines are extremely capable mechanical devices that can provide significant thrust capabilities but suffer from significant lag times between throttle input and thrust production, especially when going from low settings/RPMs to high settings/RPMs. Such lag can last several seconds due, in part, to turbine wheel inertia, compressor response, fuel supply, and combustion process that create a stack-up of latencies that delay the onset of higher thrust to meet the throttle demand. This can cause an operator, or an overall vehicle system, to err in control setting or throttle input that causes an over-shoot of the intended thrust point and a subsequent over-reaction in correction when too much thrust manifests later.

Multi-second thrust lag can have disastrous consequences when operating an aircraft or device that may need to have split second adjustments in throttle operation especially in situations needing evasive maneuvering and/or to overcome some mechanical/system failure. Typical airplane-like aircraft can offset thrust lag through manipulation of airfoil orientation to provide lift (e.g., by changing an angle of attack, extending flaps, etc.). Helicopters can similarly offset thrust lag through manipulation of the pitch of the rotor blades to increase or decrease resultant lift. However, in vertical takeoff/landing aircraft operations lacking airfoils or rotor blades, there is no such offset mechanism to address the thrust lag. Indeed, errors and overcompensation in manual throttle operations in vertical take-off aircraft have resulted in fatalities due to this lag.

The illustrated examples allow for precise, near-instantaneous (e.g., hundredths of a second) thrust response employing one or more actuated guides mounted just below (assuming a vertically oriented engine or thruster) the turbine engine or thruster in the thrust output/flow path. When open, the thrust passes through the space between the guides, allowing the full thrust capability of the engine and providing vertical lift. When fully closed, the thrust hits and/or is diverted by the guides and dissipates. Since the guides are ultimately connected to the aircraft/device chassis, the downward force is neutralized within the aircraft structure, and the engine thrust does not materially contribute to lift significant enough to elevate the vehicle/device. The employed actuators may allow for precise positioning between these two extremes, creating a fully controllable range of thrust responses with the thrust engine at substantially constant or preset RPM and fuel flow, reducing the thrust lag to the time taken to transmit a control signal to the actuator, and the actuator to respond, which, at hundredths of a second, it multiple orders of magnitude faster than turbine engine lag.

Each of the examples of a thrust system 300 illustrated in FIGS. 9A-11C provide the aforementioned features and improvements. As shown in each of the examples, the system 300 generally includes a thrust engine or thruster 302, which may include a turbojet engine, a turbofan engine, and/or a turboprop engine such as those described elsewhere herein. The thrust engine or thruster generally includes or defines an intake end or region 302a where air or other fluid is entrained into the engine, and a thrust output or exhaust end or region 302b where compressed, combusted, and/or pressurized fluid is ejected to generate thrust. The system 300 may include a deflector assembly 304 that is operable and/or configured to deflect, absorb, and/or dissipate fluid exhausted from the exhaust region 302b of the engine 302 and the associated thrust and resultant thrust vector. The deflector assembly 304 may include one or more deflecting guides 306a, 306b that are selectively and controllably movable about the exhaust region 302b of the engine 302 and the associated thrust and resultant thrust vector in order to adjust the overall thrust force magnitude and vector imparted on the aircraft, vehicle, or device (such as those disclosed herein) implementing the thrust system 300. Alternatively, each deflecting guides 306a, 306b may be independently movable from one and another. The deflector assembly diverts the thrust output into at least two thrust vectors angled with respect to an original axis of the thrust output (typically the longitudinal axis of the engine providing the thrust). The multiple thrust vectors may all have substantially the same magnitude and may be angled between approximately 45 degrees and approximately 90 degrees with respect to the first axis. Each thrust vector may have substantially the same angle with respect to the original axis of the thrust output.

The deflecting guides 306a, 306b are preferably coupled to the engine or thruster 302 (and/or otherwise to a frame or chassis of the aircraft, vehicle, or device employing the system 300) by one or more armatures, linkages, or other mechanical constructs 308. Movement and/or manipulation of the deflecting guides 306a, 306b with respect to the output of the engine or thruster 302 may be achieved by one or more actuators 310 coupled to the respective deflecting guides 306a, 306b. The actuators 310 may be operably coupled to the deflecting guides 306a, 306b by one or more armatures, linkages, or other mechanical constructs 312.

Figure 9A:
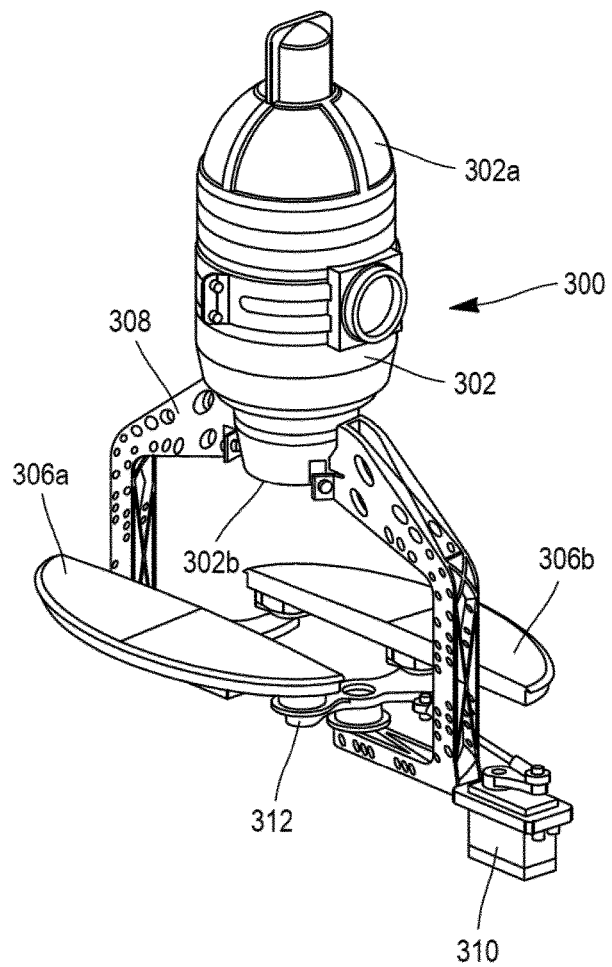
FIGS. 9A-9B illustrate an example of a thrust deflection system constructed in accordance with the principles of the present disclosure.
Figure 9B:
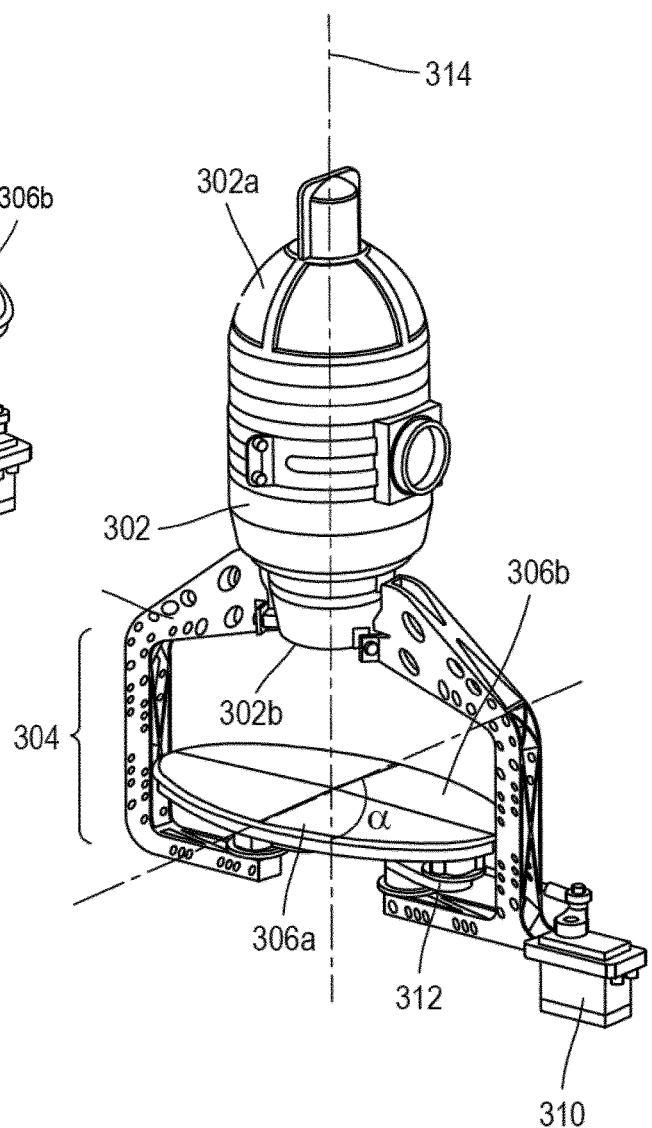

Referring now to FIGS. 9A and 9B, the deflecting guides 306a, 306b are substantially planar and are movable substantially within a plane that is substantially parallel to the upper surface of the guides 306a, 306b. FIG. 9A shows an "open" configuration where the deflecting guides 306a, 306b are positioned substantially out of the path of the exhausted fluid/thrust output of the engine or thruster 302, thereby allowing the full force and magnitude of the thrust vector provided by the engine or thruster 302 to take effect upon the aircraft, vehicle, or device employing the system 300. FIG. 12B shows a "closed" configuration where the deflecting guides 306a, 306b are juxtaposed against one another in the exhaust region 302b of the engine or thruster 302. The exhausted fluid/thrust output of the engine or thruster 302 is initially directed substantially along the longitudinal axis 314 of the engine or thruster 302. The exhausted fluid and resultant force is then directed towards the deflecting guides 306a, 306b, and is deflected or otherwise dispersed by the deflecting guides in multiple directions at an angle α away from the axis 314, with the magnitude of the resultant thrust vector along the axis 314 being substantially decreased.

Figure 10A:
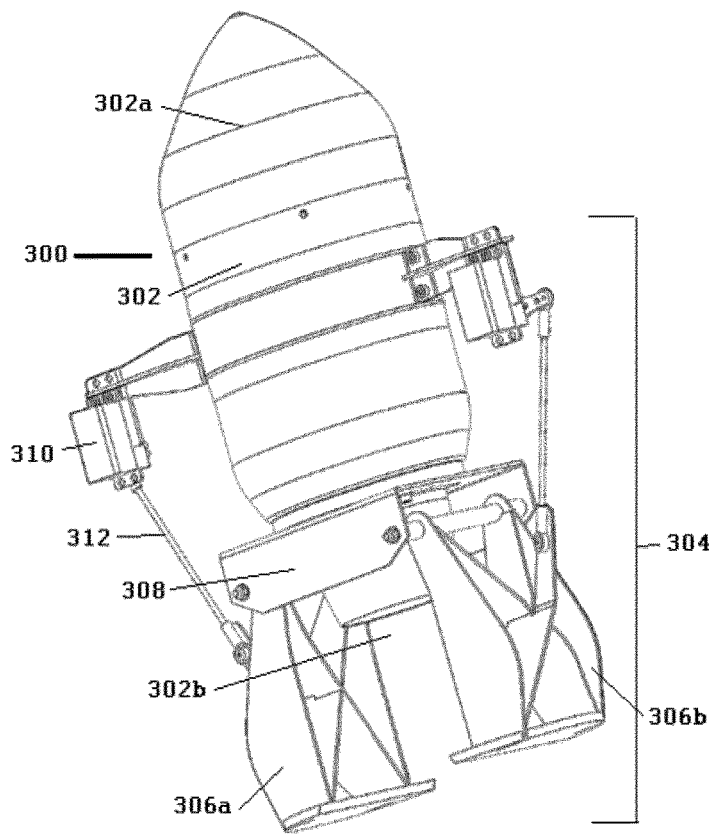
FIGS. 10A-10B illustrate an example of a thrust deflection system constructed in accordance with the principles of the present disclosure.
Figure 10B:
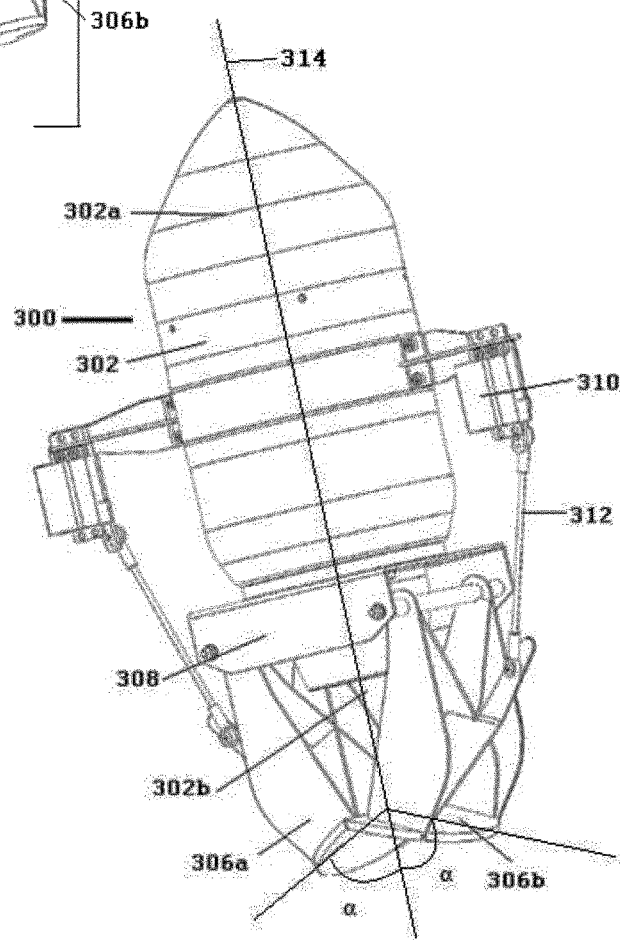

Referring now to FIGS. 10A and 10B, the deflecting guides 306a, 306b are pivotably coupled to a region proximate to the exhaust region 302b of the engine 302, enabling a "pinching movement" of the deflector assembly. FIG. 10A shows an "open" configuration where the deflecting guides 306a, 306b are positioned substantially out of the path of the exhausted fluid/thrust output of the engine or thruster 302, thereby allowing the full force and magnitude of the thrust vector provided by the engine or thruster 302 to take effect upon the aircraft, vehicle, or device employing the system 300. FIG. 10B shows a "closed" configuration where the deflecting guides 306a, 306b are closed or "pinched" together in the exhaust region 302b of the engine or thruster 302. The exhausted fluid/thrust output of the engine or thruster 302 is initially directed substantially along the longitudinal axis 314 of the engine or thruster 302. The exhausted fluid and resultant force is then directed towards the deflecting guides 306a, 306b. The deflecting guides 306a, 306b define a substantially planar bottom surface that is angled with respect to the axis 314 to deflect or otherwise disperse the exhausted fluid and resultant forces in two directions at an angle α away from the axis 314, with the magnitude of the resultant thrust vector along the axis 314 being substantially decreased.

Figure 11A:
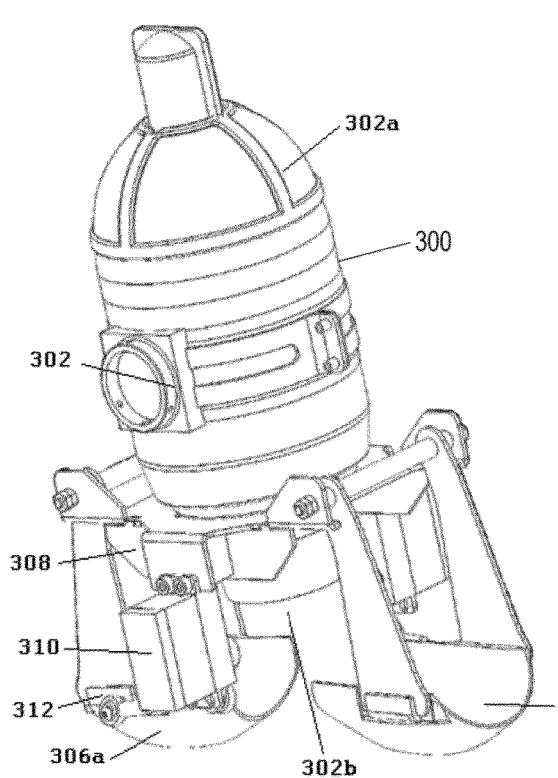
FIGS. 11A-11C illustrate an example of a thrust deflection system constructed in accordance with the principles of the present disclosure.
Figure 11B:
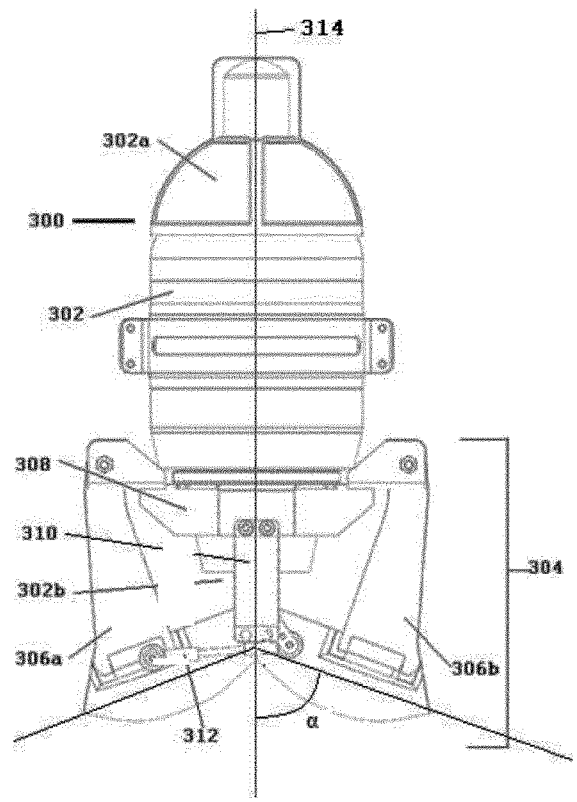

Referring now to FIGS. 11A and 11B, the deflecting guides 306a, 306b are pivotably coupled to a region proximate to the exhaust region 302b of the engine or thruster 302, enabling a "pinching movement" of the deflector assembly. The deflecting guides 306a, 306b are pivotable about an axis located above the thrust output region 302b of the thrust engine, which imparts a mechanical advantage for the resultant torque moment arm of the actuator to overcome and resist the thrust output forces of the engine or thruster 302 when closing and opening the deflecting guides 306a 306b during operation. FIG. 11A shows an "open" configuration where the deflecting guides 306a, 306b are positioned substantially out of the path of the exhausted fluid/thrust output of the engine or thruster 302, thereby allowing the full force and magnitude of the thrust vector provided by the engine or thruster 302 to take effect upon the aircraft, vehicle, or device employing the system 300.

Figure 11C:
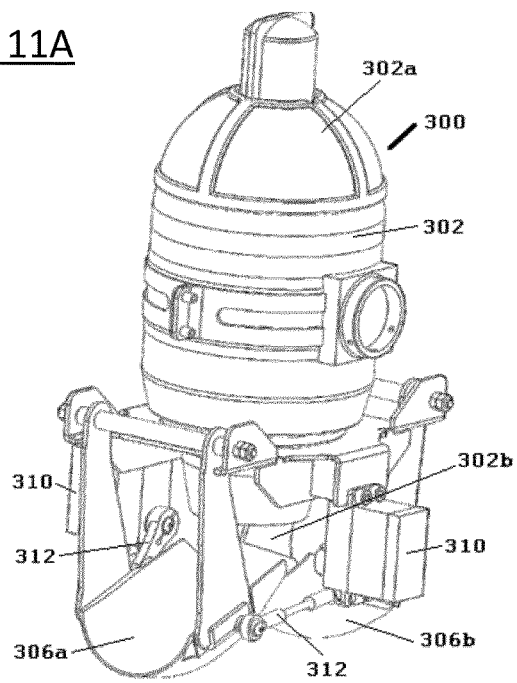

FIGS. 11B-11C show a "closed" configuration where the deflecting guides 306a, 306b are closed or "pinched" together in the exhaust region 302b of the engine or thruster 302. The exhausted fluid/thrust output of the engine or thruster 302 is initially directed substantially along the longitudinal axis 314 of the engine or thruster 302. The exhausted fluid and resultant force is then directed towards the deflecting guides 306a, 306b. The deflecting guides 306a, 306b define a substantially curvilinear, semi-circular surface that is angled with respect to the axis 314 to deflect or otherwise disperse the exhausted fluid and resultant forces in substantially two directions at an angle α away from the axis 314, with the magnitude of the resultant thrust vector along the axis 314 being substantially decreased. The use of deflecting guides 306a, 306b in a form of substantially curvilinear, semi-circular surfaces is particularly advantageous, as such substantially curvilinear, semi-circular surfaces enable the exhausted fluid to be deflected in a more precise manner in terms of direction and orientation.

The thrust systems 300 may be integrated with any of the propulsion devices disclosed herein, including with respect to the example of the propulsion devices 10 shown in FIG. 1A through FIG. 1G as well as that shown in FIGS. 8A-8D, and may also be implemented in whole or in part with the control/input features shown and described with respect to FIG. 2 through FIG. 6. Each of the aforementioned engines or thrusters may, for example, be one of a turbojet engine, a turbofan engine, and a turboprop engine, and may further include any of the directional and/or output control features described herein. Moreover, each of the aforementioned engines or thrusters may be oriented in a substantially vertical direction, as illustrated, to provide vertical take-off and landing capability, as well as the other flight features provided herein. Control of the thrust output of the systems 300 described above may be achieved through the use of one or more actuators, controllers, and or processors as described herein, and may be adjusted automatically in response to various detected, measured, and/or sensed parameters to provide flight features as also described herein.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid-state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

It will be appreciated by persons skilled in the art that the present disclosure is not limited to what has been particularly shown and described herein above. In addition, unless mention was made above to the contrary, it should be noted that all of the accompanying drawings are not to scale. Of note, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Moreover, while certain embodiments or figures described herein may illustrate features not expressly indicated on other figures or embodiments, it is understood that the features and components of the examples disclosed herein are not necessarily exclusive of each other and may be included in a variety of different combinations or configurations without departing from the scope and spirit of the disclosure. A variety of modifications and variations are possible in light of the above teachings without departing from the scope and spirit of the disclosure, which is limited only by the following claims.

The invention claimed is:

1. A thrust system, comprising:
   a thrust engine oriented in a substantially vertical direction to provide vertical take-off and landing capability and configured to provide a thrust output, comprising one or more exhausted fluid outputs, substantially along a first axis;
   a deflector assembly movably coupled to the thrust engine,
   wherein the deflector assembly includes a pair of deflecting guides, each deflecting guide of said pair of deflecting guides being independently movable one from another to selectively deflect a portion of one of said one or more exhausted fluid outputs to divert said one of said one or more exhausted fluid outputs into at least two thrust vectors angled with respect to the first axis, and
   wherein the deflecting guides are displaceable toward and away from each other between a closed configuration in which the deflecting guides are juxtaposed against one another and are within a path of the exhausted fluid output, and an open configuration in which the deflecting guides are apart and out of the path of the exhausted fluid output.

2. The thrust system according to claim 1, wherein at least two thrust vectors all have substantially the same magnitude.

3. The thrust system according to claim 1, wherein each thrust vector is angled between 45 degrees and 90 degrees with respect to the first axis.

4. The thrust system according to claim 1, wherein each thrust vector has substantially the same angle with respect to the first axis.

5. The thrust system according to claim 1, wherein the deflecting guides each define a substantially curvilinear surface that deflects said one of said one or more exhausted fluid outputs.

6. The thrust system according to claim 1, wherein the deflecting guides each define a surface having a substantially semicircular cross-section that deflects said one of said one or more exhausted fluid outputs.

7. The thrust system according to claim 1, wherein the deflecting guides are pivotable with respect to the thrust engine.

8. The thrust system according to claim 1, wherein the thrust engine is one of a turbojet engine, a turbofan engine, and a turboprop engine.

9. The thrust system according to claim 1, wherein, in the closed configuration, the deflecting guides reduce a vertical component of the thrust output without reversing its direction.

10. The thrust system according to claim 1, further comprising at least two actuators coupled to the respective deflecting guides to controllably adjust a position of the respective deflecting guides with respect to the thrust engine.

11. The thrust system according to claim 10, further comprising a controller in communication with the at least two actuators, wherein the controller is configured to operate the at least two actuators in response to one or more signals from at least one of an operator and a sensor.

12. The thrust system according to claim 1, wherein the respective deflecting guides are each substantially planar and oriented in a plane substantially perpendicular to the first axis.

13. The thrust system according to claim 12, wherein the deflecting guides are movable towards and away from one another within the plane.

14. The thrust system according to claim 1, wherein the deflecting guides are pivotable about a second axis substantially perpendicular to the first axis.

15. The thrust system according to claim 14, wherein the second axis is located above the thrust output of the thrust engine.

16. A propulsion device, comprising:
   a platform configured to support a passenger thereon; and
   a thrust system according to claim 1 coupled to the platform.

* * * * *